(12) United States Patent
Iwata et al.

(10) Patent No.: US 9,071,154 B2
(45) Date of Patent: Jun. 30, 2015

(54) DC-DC CONVERTER, SOLAR CHARGING SYSTEM, AND MOVABLE BODY

(71) Applicants: Hiroshi Iwata, Osaka (JP); Yoshifumi Yaoi, Osaka (JP); Kenji Komiya, Osaka (JP); Masaru Nomura, Osaka (JP); Yoshiji Ohta, Osaka (JP)

(72) Inventors: Hiroshi Iwata, Osaka (JP); Yoshifumi Yaoi, Osaka (JP); Kenji Komiya, Osaka (JP); Masaru Nomura, Osaka (JP); Yoshiji Ohta, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 437 days.

(21) Appl. No.: 13/665,382

(22) Filed: Oct. 31, 2012

(65) Prior Publication Data

US 2013/0106342 A1 May 2, 2013

(30) Foreign Application Priority Data

Oct. 31, 2011 (JP) ................. 2011-238544

(51) Int. Cl.

| | |
|---|---|
| *H01M 10/44* | (2006.01) |
| *H02J 7/04* | (2006.01) |
| *H02J 1/00* | (2006.01) |
| *H02J 1/10* | (2006.01) |
| *H01L 31/042* | (2014.01) |
| *H02M 7/5383* | (2007.01) |
| *H02M 3/335* | (2006.01) |
| *H02M 3/24* | (2006.01) |
| *H02J 7/02* | (2006.01) |
| *H02M 7/30* | (2006.01) |
| *H02J 7/00* | (2006.01) |

(Continued)

(52) U.S. Cl.
CPC ............. *H02M 3/3353* (2013.01); *H02J 7/022* (2013.01); *H02M 7/30* (2013.01); *H02J 7/0054* (2013.01); *B60L 8/003* (2013.01); *B60L 11/1868* (2013.01); *H02J 2007/0059* (2013.01); *B60L 2210/12* (2013.01); *B60L 2210/14* (2013.01); *B60L 2240/526* (2013.01); *B60L 2240/527* (2013.01); *Y02T 10/7005* (2013.01); *Y02T 10/7233* (2013.01); *Y02T 10/7225* (2013.01); *Y02T 10/7066* (2013.01); *Y02T 10/7083* (2013.01)

(58) Field of Classification Search
CPC ....... H02M 7/40; H02M 7/44; H02M 3/3353; H02M 3/33584; H02J 3/383; H02J 7/022; H02J 1/108; H01L 31/042; G05F 1/67
USPC ......... 320/101, 140; 136/244; 363/16, 74, 95; 307/82, 43
See application file for complete search history.

(56) References Cited

U.S. PATENT DOCUMENTS

| | | | | |
|---|---|---|---|---|
| 4,513,835 | A | * | 4/1985 | Fukino et al. ................. 180/422 |
| 4,858,093 | A | * | 8/1989 | Sturgeon .......................... 363/20 |

(Continued)

FOREIGN PATENT DOCUMENTS

| | | |
|---|---|---|
| CN | 201128379 Y | 10/2008 |
| CN | 102118050 A | 7/2011 |

(Continued)

*Primary Examiner* — M'Baye Diao
(74) *Attorney, Agent, or Firm* — Birch, Stewart, Kolasch & Birch, LLP

(57) ABSTRACT

This DC/DC converter includes a first DC/DC converter, and a second DC/DC converter for carrying out a DC/DC conversion of voltage supplied from the first DC/DC converter. One of either the first DC/DC converter or the second DC/DC converter is a fixed-factor DC/DC converter, and the other of either the first DC/DC converter or the second DC/DC converter is a variable-factor DC/DC converter.

19 Claims, 27 Drawing Sheets

(51) Int. Cl.
*B60L 8/00* (2006.01)
*B60L 11/18* (2006.01)

(56) References Cited

U.S. PATENT DOCUMENTS

| | | | |
|---|---|---|---|
| 5,903,138 A * | 5/1999 | Hwang et al. | 323/266 |
| 6,493,242 B1 * | 12/2002 | Riggio et al. | 363/16 |
| 8,228,690 B2 * | 7/2012 | Watanabe et al. | 363/16 |
| 2005/0151517 A1 * | 7/2005 | Cook et al. | 323/207 |
| 2005/0206358 A1 * | 9/2005 | Van Der Horn et al. | 323/282 |
| 2006/0256594 A1 * | 11/2006 | Lam | 363/74 |
| 2010/0157632 A1 * | 6/2010 | Batten et al. | 363/74 |
| 2011/0032733 A1 | 2/2011 | Watanabe et al. | |

FOREIGN PATENT DOCUMENTS

| | | |
|---|---|---|
| JP | 7-322524 A | 12/1995 |
| JP | 2000-50402 A | 2/2000 |
| JP | 2011-36086 A | 2/2011 |
| JP | 2011-148390 A | 8/2011 |
| JP | 2011-186112 A | 9/2011 |
| JP | 2011-205536 A | 10/2011 |

* cited by examiner

DC-DC CONVERTER, SOLAR CHARGING SYSTEM, AND MOVABLE BODY

This non-provisional application claims priority under 35 U.S.C. §119(a) on Patent Application No. 2011-238544 filed in Japan on Oct. 31, 2011, the entire contents of which are hereby incorporated by reference.

BACKGROUND OF THE INVENTION

1. Field of the Invention

The present invention relates to a DC/DC converter for carrying out DC/DC conversion, as well as to a solar charging system and movable body provided with same.

2. Description of the Related Art

A variety of different configurations for a DC/DC converter capable of carrying out DC/DC conversion have been proposed in the past. For example, a power source device (bidirectional DC/DC converter) disclosed in Japanese Laid-open Patent Application No. 2000-50402 comprises a push-pull circuit 101, a transformer 102, a full-bridge circuit 103, and a step-up chopper circuit provided between a capacitor 104 and a main battery 105, as illustrated in FIG. 29.

The power source device disclosed in Japanese Laid-open Patent Application No. 2000-50402 cuts off a relay contact 106 when the main battery 105 is charged from an auxiliary equipment battery 100, and performs a step-up operation in the sequence of push-pull circuit 101→the transformer 102→the full-bridge circuit 103 (used as a rectifier circuit) →step-up chopper circuit. Also, the power source device disclosed in Japanese Laid-open Patent Application No. 2000-50402 allows conduction through the relay contact 106 when the auxiliary equipment battery 100 is charged from the main battery 105, and performs a step-down operation via the full-bridge circuit 103, the transformer 102, and the push-pull circuit 101.

The power source device disclosed in Japanese Laid-open Patent Application No. 2000-50402 is limited to application in a hybrid electric automotive vehicle. Accordingly, in the power source device disclosed in Japanese Laid-open Patent Application No. 2000-50402, the main application is to charge the auxiliary equipment battery 100 from the main battery 105, and charging of the main battery 105 from the auxiliary equipment battery 100 is mainly carried out for reverse transmission of electricity from the auxiliary equipment battery 100 to an engine startup motor when there is insufficient power in the main battery 105. Therefore, the power source device disclosed in Japanese Laid-open Patent Application No. 2000-50402 does not require high power transmission.

However, in association with the higher capacity of cells mounted in automotive vehicles in recent years, there has been a need for higher-efficiency power transmission. A particularly major problem in electric automotive vehicles is cruising distance, and a system that makes efficient use of electricity has become essential.

However, in the power source device disclosed in Japanese Laid-open Patent Application 2000-50402, duty control is not illustrated in detail, and Japanese Laid-open Patent Application 2000-50402 neither discloses nor suggests any technique whereby high-efficiency operations are always carried out in accordance with the various states of the auxiliary equipment battery 100 and the main battery 105.

Moreover, in the power source device disclosed in Japanese Laid-open Patent Application 2000-50402, voltage is stepped down out solely in the full-bridge circuit 103 and the transformer 102 during the charging of the auxiliary equipment battery 100 from the main battery 105, and it has thus been difficult to control the step-down factor within a broad range.

SUMMARY OF THE INVENTION

It is an objective of the present invention, which has been contrived in view of the foregoing circumstances, to provide a DC/DC converter whereby greater efficiency can be achieved, as well as to provide a solar charging system and movable body provided with same.

In order to achieve the foregoing objective, a (first) aspect of the DC/DC converter as in the present invention is a configuration comprising a first DC/DC converter and a second DC/DC converter for carrying out DC/DC conversion of voltage supplied from the first DC/DC converter, one of the first DC/DC converter or the second DC/DC converter being a fixed-factor DC/DC converter and the other of the first DC/DC converter or the second DC/DC converter being a variable-factor DC/DC converter.

Another possible (second) aspect is the DC/DC converter of the first aspect, the fixed-factor DC/DC converter being an insulation-type DC/DC converter having a transformer, and the variable-factor DC/DC converter being a non-insulation-type DC/DC converter.

Another possible (third) aspect of the DC/DC converter of the first or second aspect, the first DC/DC converter being the variable-factor DC/DC converter and the second DC/DC converter being the fixed-factor DC/DC converter; the DC/DC converter comprising a load circuit connected to a connection point between the first DC/DC converter and the second DC/DC converter, the load circuit being a load circuit capable of switching between an operating state and a non-operating state, and the first DC/DC converter and the second DC/DC converter being DC/DC converters for carrying out a step-down operation together.

Another possible (fourth) aspect is the DC/DC converter of any of the first through third aspects, the first DC/DC converter and the second DC/DC converter being bidirectional DC/DC converters.

Another possible (fifth) aspect is the DC/DC converter of the fourth aspect, the variable-factor DC/DC converter carries out a DC/DC conversion in a direction from the variable-factor DC/DC converter toward the fixed-factor DC/DC converter and gradually steps up the voltage of the connection point between the fixed-factor DC/DC converter and the variable-factor DC/DC converter, before the DC/DC converter starts a power transmission operation from the fixed-factor DC/DC converter to the variable-factor DC/DC converter.

Another possible (sixth) aspect is the DC/DC converter of any of the first through fifth aspects, an operating frequency of the first DC/DC converter and an operating frequency of the second DC/DC converter being mutually different.

A solar charging system as in the present invention comprises a solar cell, a first power storage device for storing power outputted from the solar cell, a second power storage device having a greater voltage than the first power storage device, and a bidirectional DC/DC converter for transmitting power between the first power storage device and the second power storage device, the bidirectional DC/DC converter being the DC/DC converter as in any of the first through sixth aspects.

A movable body as in the present invention is provided with the solar charging system of the foregoing aspect.

According to a preferred aspect of the movable body of the foregoing aspect, power outputted from the second power storage device provided to the solar charging system being used as power for driving the movable body. Also, preferably, the voltage of the second power storage device is made to be higher than the voltage of the first power storage device.

DESCRIPTION OF THE PREFERRED EMBODIMENTS

Embodiments of the present invention are described below with reference to the accompanying drawings.

Figure 1:
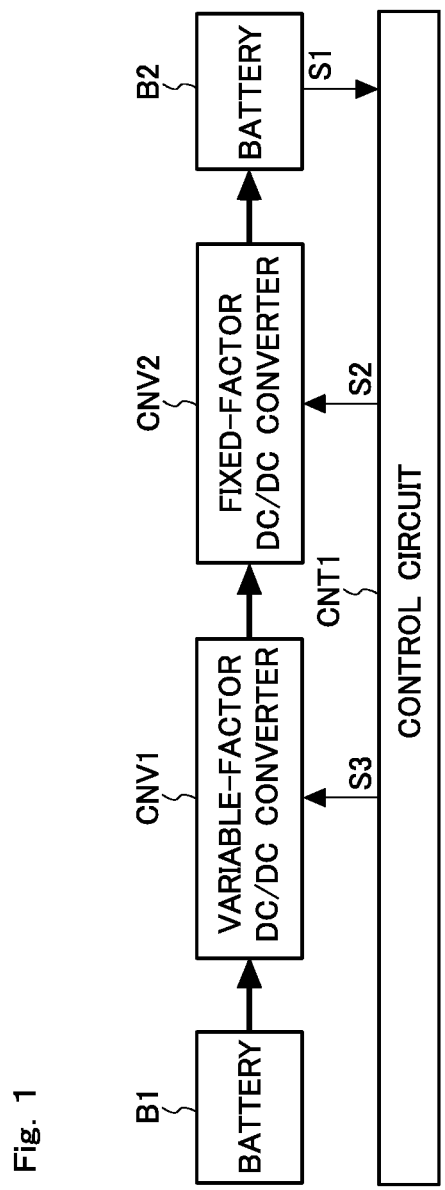
FIG. 1 illustrates a configuration of a DC/DC converter as in a first embodiment of the present invention.

The description shall first relate to the DC/DC converter as in the first embodiment of the present invention. FIG. 1 illustrates the configuration of the DC/DC converter as in the first embodiment of the present invention. The DC/DC converter as in the first embodiment of the present invention illustrated in FIG. 1 is provided with a variable-factor DC/DC converter CNV1 and a fixed-factor DC/DC converter CNV2. In the first embodiment of the present invention, the variable-factor DC/DC converter CNV1 carries out a DC/DC conversion of voltage supplied to a battery B1 and supplies same to the fixed-factor DC/DC converter CNV2. The fixed-factor DC/DC converter CNV2 carries out a DC/DC conversion of the voltage supplied from the variable-factor DC/DC converter CNV1 and supplies same to a battery B2.

A control circuit CNT1 outputs a control signal S3 to the fixed-factor DC/DC converter CNV2 so that the fixed-factor DC/DC converter CNV2 carries out the DC/DC conversion always at the same scale. Examples for the control signal S3 include a fixed duty signal.

The control circuit CNT1 generates a control signal S2 on the basis of an information signal S1 relating to the status of the battery B2 and outputs the control signal S2 to the variable-factor DC/DC converter CNV2 so that the variable-factor DC/DC converter CNV2 carries out the DC/DC conversion at a suitable scale in accordance with the status of the battery B2. Examples for the information signal S1 include an information signal relating to the voltage of the battery B2, and examples for the control signal S2 include a variable duty signal.

The conversion scale that will be efficient for the DC/DC converter varies depending on the circuit scheme. For this reason, configuring a two-stage combination of the variable-factor DC/DC converter CNV1 and the fixed-factor DC/DC converter CNV2, as with the DC/DC converter as in the first embodiment of the present invention illustrated in FIG. 1, a DC/DC converter having a relatively small change in efficiency relative to a change in the conversion scale being used for the variable-factor DC/DC converter CNV1 and a DC/DC converter having a relatively large change in efficiency relative to a change in the conversion scale being used for the fixed-factor DC/DC converter CNV2, makes it possible to transmit power from the battery B1 to the battery B2 at high efficiency, irrespective of the status between the two batteries B1 and B2.

It is therefore preferable to use for the variable-factor DC/DC converter CNV1 a non-insulation-type chopper circuit, which is a DC/DC converter having a relatively small change in efficiency relative to a change in the conversion scale, and to use for the fixed-factor DC/DC converter CNV2 an insulation-type DC/DC converter having a relatively large change in efficiency relative to a change in the conversion scale (a DC/DC converter provided with a transformer).

Figure 2:
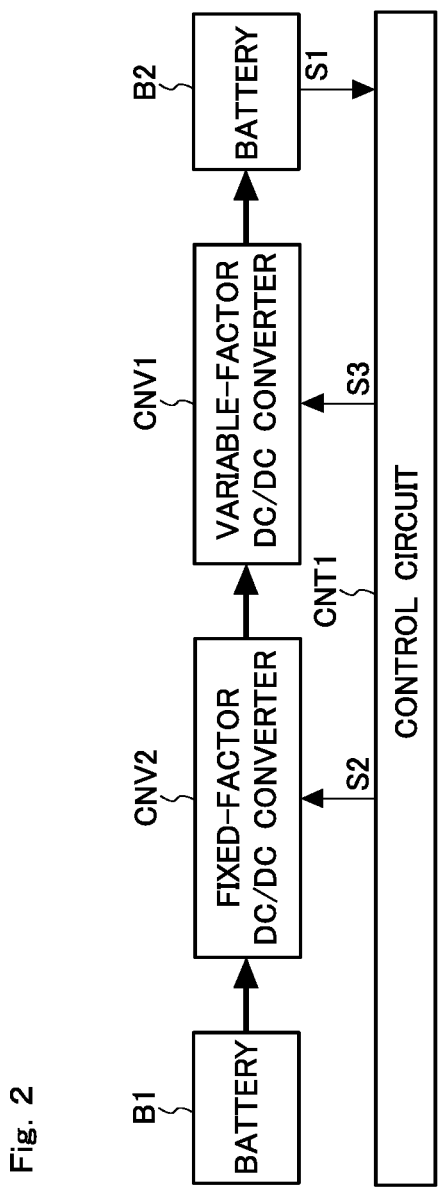
FIG. 2 illustrates a configuration of a DC/DC converter as in a second embodiment of the present invention.

The description shall now relate to the DC/DC converter as in the second embodiment of the present invention. FIG. 2 illustrates the configuration of the DC/DC converter as in the second embodiment of the present invention. The DC/DC converter as in the second embodiment of the present invention illustrated in FIG. 2 is a configuration in which the arrangement of the variable-factor DC/DC converter CNV1 and the fixed-factor DC/DC converter CNV2 in the DC/DC converter as in the first embodiment of the present invention illustrated in FIG. 1 has been switched. In the second embodiment of the present invention, therefore, the fixed-factor DC/DC converter CNV2 carries out the DC/DC conversion of the voltage supplied from the battery B1 and supplies same to the variable-factor DC/DC converter CNV1, and the variable-factor DC/DC converter CNV1 carries out a DC/DC conversion of the voltage supplied from the fixed-factor DC/DC converter CNV2 and supplies same to the battery B2.

Preferred examples of the control content for the control circuit CNT1 and of the variable-factor DC/DC converter CNV1 and the fixed-factor DC/DC converter CNV2 are similar with respect to the first embodiment of the present invention, and a description thereof has thus been omitted.

Figure 3:
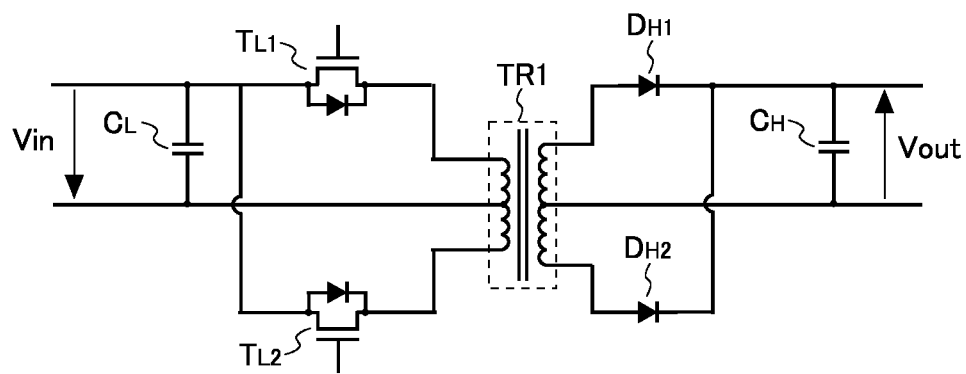
FIG. 3 illustrates an example of a configuration of a fixed-factor DC/DC converter provided to a DC/DC converter as in the present invention.
Figure 4:
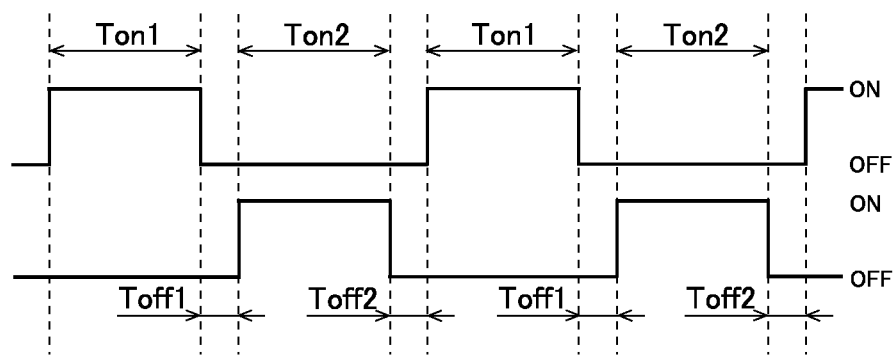
FIG. 4 is a timing chart illustrating the timing for switching between ON and OFF for respective transistors belonging to the fixed-factor DC/DC converter of the configuration illustrated in FIG. 3.

Herein, FIG. 3 illustrates an example of a configuration of the fixed-factor DC/DC converter CNV2 provided to the DC/DC converter as in the present invention, and FIG. 4 illustrates a timing chart for switching between ON and OFF in transistors $T_{L1}$ and $T_{L2}$ belonging to the fixed-factor DC/DC converter CNV2 of the configuration illustrated in FIG. 3.

The fixed-factor DC/DC converter CNV2 of the configuration illustrated in FIG. 3 is provided with: a capacitor $C_L$; the transistors $T_{L1}$ and $T_{L2}$, which are N-channel MOSFETs; a transformer TR1; diodes $D_{H1}$ and $D_{H2}$; and a capacitor $C_H$.

A drain of the transistor $T_{L1}$ is connected to one end of a primary winding of the transformer TR1, and a drain of the transistor $T_{L2}$ is connected to the other end of the primary winding of the transformer TR1; sources of each of the transistors $T_{L1}$ and $T_{L2}$ are connected to one end of a capacitor $C_L$, and the other end of the capacitor $C_L$ is connected to a center tap of the primary winding of the transformer TR1.

The anode of the diode $D_{H1}$ is connected to one end of a secondary winding of the transformer TR1 and the anode of the diode $D_{H2}$ is connected to the other end of the secondary winding of the transformer TR1; the respective cathodes of the diodes $D_{H1}$ and $D_{H2}$ are connected to one end of the capacitor $C_H$, and the other end of the capacitor $C_H$ is connected to a center tap of the secondary winding of the transformer TR1.

In the fixed-factor DC/DC converter CNV2 of the configuration illustrated in FIG. 3, there is repeated an operation where, as is illustrated in FIG. 4, a time Ton1 where only the transistor $T_{L1}$ is on is followed by a time Toff1 where both the transistors $T_{L1}$ and $T_{L2}$ are off, and thereafter the flow migrates to a time Ton2 where only the transistor $T_{L2}$ is on, and the time Ton2 where only the transistor $T_{L2}$ is on is followed by a time Toff2 where both the transistors $T_{L1}$ and $T_{L2}$ are off, and thereafter the flow migrates to the time Ton1 where only the transistor $T_{L1}$ is on.

In the fixed-factor DC/DC converter CNV2 illustrated in FIG. 3, it becomes possible to transmit power at high efficiency and high power when a relationship represented by the following equation (1) holds true. "Ton" in the following equation (1) is Ton=Ton1+Ton2, and "Toff" in the following equation (1) is Toff=Toff1+Toff2.

$$Ton/(Ton+Toff) > 0.7 \qquad (1)$$

In a case where a relationship represented by the equation (1) does not hold true, then a large current in accordance with the load will flow for the brief "ON" time (Ton), and thus there will be a decline in efficiency because the resistance loss will increase. The control circuit CNT1 (see FIGS. 1 and 2) thus preferably generates a control signal S3 whereby a relationship represented by the equation (1) will hold true.

Figure 5:
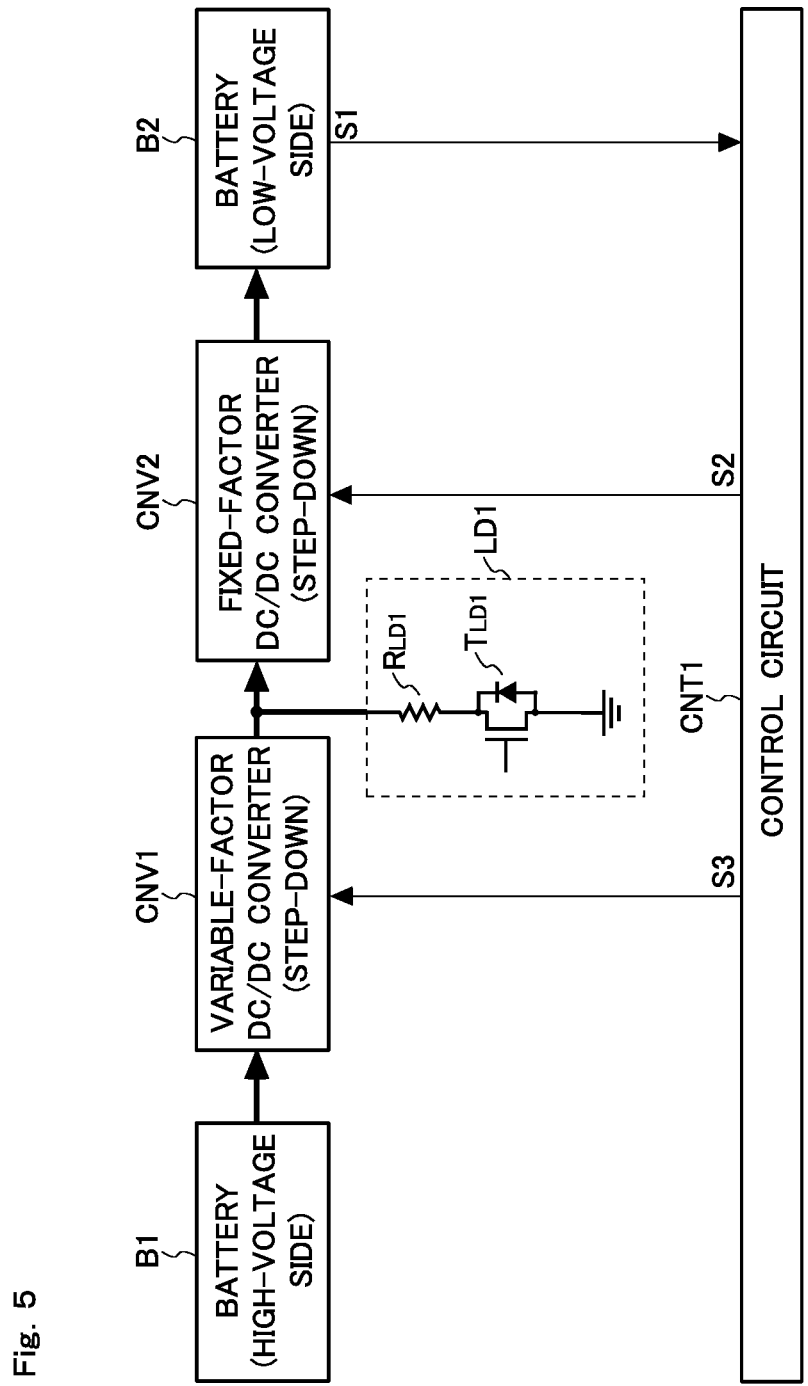
FIG. 5 illustrates a configuration of a DC/DC converter as in a third embodiment of the present invention.

The description shall now relate to the DC/DC converter as in the third embodiment of the present invention. FIG. 5 illustrates the configuration of the DC/DC converter as in the third embodiment of the present invention. The DC/DC converter as in the third embodiment of the present invention illustrated in FIG. 5 is a configuration where a load circuit LD1 has been added to the DC/DC converter as in the first embodiment of the present invention illustrated in FIG. 1.

In the present embodiment, the voltage of the battery B1 is higher than the voltage of the battery B2, and the variable-factor DC/DC converter CNV1 and the fixed-factor DC/DC converter CNV2 are made to each carry out a step-down operation.

The load circuit LD1 is a load circuit capable of switching between an operating state and a non-operating state. In an exemplary case, as illustrated in FIG. 5, where the load circuit LD1 is a series circuit constituted of a resistor $R_{LD1}$ and a transistor $T_{LD1}$, which is an N-channel MOSFET, then turning the transistor $T_{LD1}$ on places the load circuit LD1 in the operating state, and turning the transistor $T_{LD1}$ off places the load circuit LD1 in the non-operating state.

In the DC/DC converter as in the third embodiment of the present invention, when the load circuit LD1 is in the non-operating state at all times, then during the start of the step-down operation the output voltage of the fixed-factor DC/DC converter CNV2 may in some cases be merely 0 [V] during a transition period where the voltage of the connection point between the variable-factor DC/DC converter CNV1 and the fixed-factor DC/DC converter CNV2 is stepped up from 0 [V] to a desired voltage value, in which state the output of the variable-factor DC/DC converter CNV1 substantially reaches a floating state, and the operation of the variable-factor DC/DC converter CNV1 becomes either abnormal or unstable.

In view whereof, during the start of the step-down operation, the load circuit LD1 is placed in the operating state to avoid a situation where the output of the variable-factor DC/DC converter CNV1 reaches a floating state. After the variable-factor DC/DC converter CNV1 has achieved a state where operation is stable and a load current is obtained from the output of the fixed-factor DC/DC converter CNV2, the load circuit LD1 is switched from the operating state to the non-operating state, and power is transferred from the battery B1 to the battery B2 as originally carried out.

Figure 6:
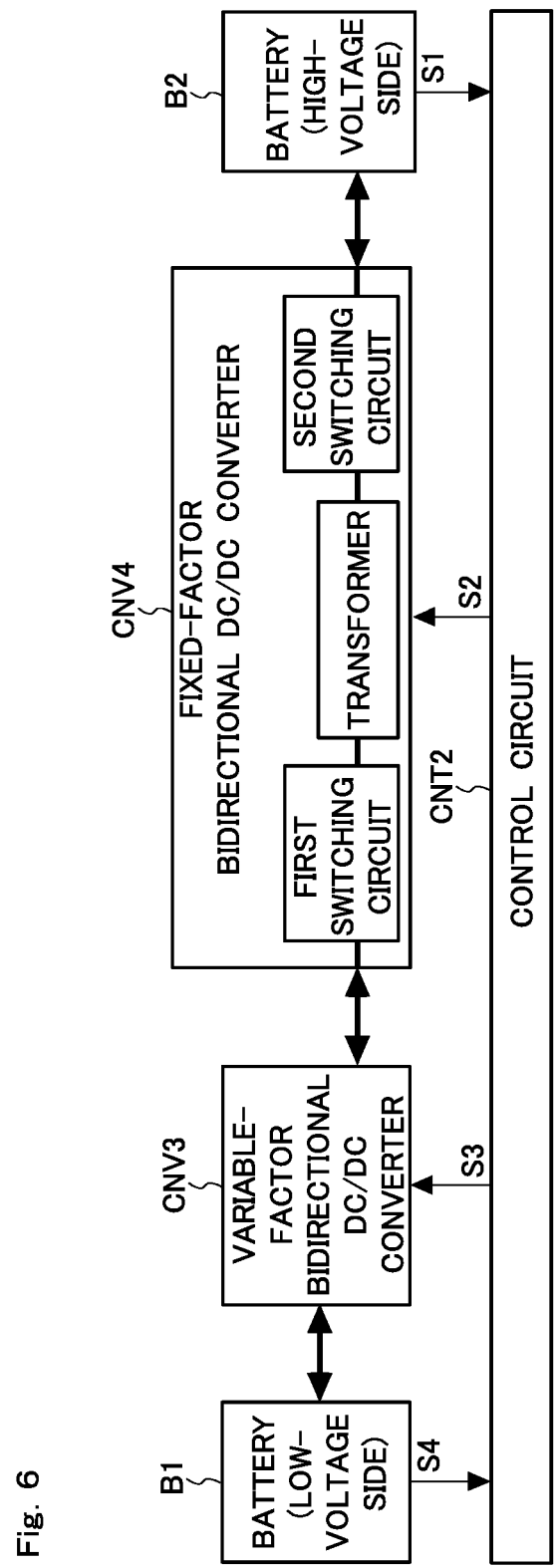
FIG. 6 illustrates a configuration of a DC/DC converter as in a fourth embodiment of the present invention.

The description shall now relate to the DC/DC converter as in the fourth embodiment of the present invention. FIG. 6 illustrates the configuration of the DC/DC converter as in the fourth embodiment of the present invention. The DC/DC converter as in the fourth embodiment of the present invention illustrated in FIG. 6 represents the modification of the DC/DC converter as in the first embodiment of the present invention illustrated in FIG. 1 to a bidirectional DC/DC converter.

The DC/DC converter as in the fourth embodiment of the present invention illustrated in FIG. 6 is provided with a variable-factor bidirectional DC/DC converter CNV3 and a fixed-factor bidirectional DC/DC converter CNV4. In the present embodiment, the voltage of the battery B1 is lower than the voltage of the battery B2.

In the fourth embodiment of the present invention, in a case where power is to be transmitted from the battery B1 to the battery B2, the variable-factor bidirectional DC/DC converter CNV3 carries out the DC/DC conversion of the voltage supplied from the battery B1 and supplies same to the fixed-factor bidirectional DC/DC converter CNV4, and the fixed-factor bidirectional DC/DC converter CNV4 carries out a DC/DC conversion of the voltage supplied from the variable-factor bidirectional DC/DC converter CNV3 and supplies same to the battery B2. By contrast, in a case where power is to be transmitted from the battery B2 to the battery B1, the fixed-factor bidirectional DC/DC converter CNV4 carries out the DC/DC conversion of the voltage supplied from the battery B2 and supplies same to the variable-factor bidirectional DC/DC converter CNV3, and the variable-factor bidirectional DC/DC converter CNV3 carries out a DC/DC conversion of the voltage supplied from the fixed-factor bidirectional DC/DC converter CNV4 and supplies same to the battery B1.

A control circuit CNT2 outputs the control signal S3 to the fixed-factor bidirectional DC/DC converter CNV4 so that the fixed-factor bidirectional DC/DC converter CNV4 carries out the DC/DC conversion always at the same scale. Examples for the control signal S3 include a fixed duty signal. Different fixed-factors are set respectively for the case where power is to be transmitted from the battery B1 to the battery B2 and the case where power is to be transmitted from the battery B2 to the battery B1.

In the case where power is to be transmitted from the battery B1 to the battery B2, the control circuit CNT2 generates the control signal S2 on the basis of the information signal S1 relating to the status of the battery B2 and outputs the control signal S2 to the variable-factor bidirectional DC/DC converter CNV3 so that the variable-factor bidirectional DC/DC converter CNV3 carries out the DC/DC conversion at a suitable scale in accordance with the status of the battery B2. In the case where power is to be transmitted from the battery B2 to the battery B1, the control circuit CNT2 generates the control signal S2 on the basis of an information signal S4 relating to the status of the battery B1 and outputs the control signal S2 to the variable-factor bidirectional DC/DC converter CNV3 so that the variable-factor bidirectional DC/DC converter CNV3 carries out the DC/DC conversion at a suitable scale in accordance with the status of the battery B1. Examples for the information signal S1 include an information signal relating to the voltage of the battery B2, examples for the information signal S4 include an information signal relating to the voltage of the battery B1, and examples for the control signal S2 include a variable duty signal.

Figure 7:
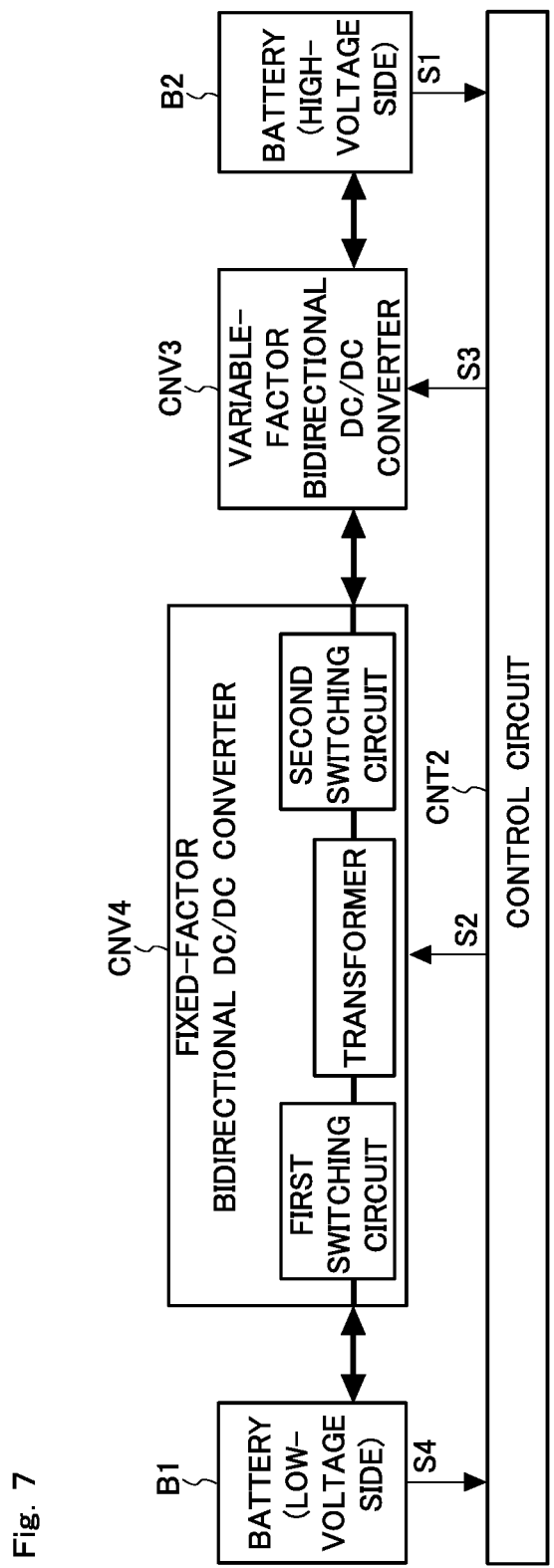
FIG. 7 illustrates a configuration of a DC/DC converter as in a fifth embodiment of the present invention.

Preferred examples for the variable-factor bidirectional DC/DC converter CNV3 and for the fixed-factor bidirectional DC/DC converter CNV4 are similar to the preferred examples for the variable-factor DC/DC converter CNV1 and for the fixed-factor DC/DC converter CNV2, and a description thereof has thus been omitted. In order to enable bidirectional DC/DC conversion in a case where the fixed-factor bidirectional DC/DC converter CNV4 is an insulation-type DC/DC converter (a DC/DC converter provided with a transformer), the fixed-factor bidirectional DC/DC converter CNV4 is, as illustrated in FIG. 7, constituted of a transformer, a first switching circuit connected to a low-voltage winding of the transformer, and a second switching circuit connected to a high-voltage winding of the transformer.

According to the DC/DC converter as in the fourth embodiment of the present invention illustrated in FIG. 6, bidirectional power transmission between the battery B1 and the battery B2 at high efficiency becomes possible, irrespective of the status between the two batteries B1 and B2.

When the fixed-factor bidirectional DC/DC converter CNV4 is operated immediately at the start of power transmission from the battery B2 to the battery B1 in the DC/DC converter as in the fourth embodiment of the present invention illustrated in FIG. 6, a considerable inrush current is generated in the fixed-factor bidirectional DC/DC converter CNV4 when there is a large difference between the voltage of the connection point between the variable-factor bidirectional DC/DC converter CNV3 and the fixed-factor bidirectional DC/DC converter CNV4 and a value obtained by multiplying the step-down factor of the fixed-factor bidirectional DC/DC converter CNV4 by the voltage of the battery B2.

In order to suppress this inrush current, preferably, the variable-factor bidirectional DC/DC converter CNV3 carries out the DC/DC conversion in the direction from the variable-factor bidirectional DC/DC converter CNV3 toward the fixed-factor bidirectional DC/DC converter CNV4 and gradually steps up the voltage of the connection point between the variable-factor bidirectional DC/DC converter CNV3 and the fixed-factor bidirectional DC/DC converter CNV4 before the transmission of power from the battery B2 to the battery B1 is started. More preferably, the fixed-factor bidirectional DC/DC converter CNV4 is operated after the voltage of the connection point between the variable-factor bidirectional DC/DC converter CNV3 and the fixed-factor bidirectional DC/DC converter CNV4 has attained the value obtained by multiplying the step-down factor of the fixed-factor bidirectional DC/DC converter CNV4 by the voltage of the battery B2.

The description shall now relate to the DC/DC converter as in the fifth embodiment of the present invention. FIG. 7 illustrates the configuration of the DC/DC converter as in the fifth embodiment of the present invention. The DC/DC converter as in the fifth embodiment of the present invention illustrated in FIG. 7 is a configuration in which the arrangement of the variable-factor bidirectional DC/DC converter CNV3 and the fixed-factor bidirectional DC/DC converter CNV4 in the DC/DC converter as in the fourth embodiment of the present invention illustrated in FIG. 6 has been switched. In the fifth embodiment of the present invention, therefore, in the case where power is to be transmitted from the battery B1 to the battery B2, the fixed-factor bidirectional DC/DC converter CNV4 carries out the DC/DC conversion of the voltage supplied from the battery B1 and supplies same to the variable-factor bidirectional DC/DC converter CNV3, and the variable-factor bidirectional DC/DC converter CNV3 carries out the DC/DC conversion of the voltage supplied from the fixed-factor bidirectional DC/DC converter CNV4 and supplies same to the battery B2. By contrast, in the case where power is to be transmitted from the battery B2 to the battery B1, the variable-factor bidirectional DC/DC converter CNV3 carries out the DC/DC conversion of the voltage supplied from the battery B2 and supplies same to the fixed-factor bidirectional DC/DC converter CNV4, and the fixed-factor bidirectional DC/DC converter CNV4 carries out the DC/DC conversion of the voltage supplied from the variable-factor bidirectional DC/DC converter CNV3 and supplies same to the battery B1.

Preferred examples of the control content for the control circuit CNT2 and of the variable-factor bidirectional DC/DC converter CNV3 and the fixed-factor bidirectional DC/DC converter CNV4 are similar with respect to the fourth embodiment of the present invention, and a description thereof has thus been omitted.

When the fixed-factor bidirectional DC/DC converter CNV4 is operated immediately at the start of power transmission from the battery B1 to the battery B2 in the DC/DC converter as in the fifth embodiment of the present invention illustrated in FIG. 7, a considerable inrush current is generated in the fixed-factor bidirectional DC/DC converter CNV4 when there is a large difference between the voltage of the connection point between the variable-factor bidirectional DC/DC converter CNV3 and the fixed-factor bidirectional DC/DC converter CNV4 and a value obtained by multiplying the step-up factor of the fixed-factor bidirectional DC/DC converter CNV4 by the voltage of the battery B1.

In order to suppress this inrush current, preferably, the variable-factor bidirectional DC/DC converter CNV3 carries out the DC/DC conversion in the direction from the variable-factor bidirectional DC/DC converter CNV3 toward the fixed-factor bidirectional DC/DC converter CNV4 and gradually steps up the voltage of the connection point between the variable-factor bidirectional DC/DC converter CNV3 and the fixed-factor bidirectional DC/DC converter CNV4 before the transmission of power from the battery B1 to the battery B2 is started. More preferably, the fixed-factor bidirectional DC/DC converter CNV4 is operated after the voltage of the connection point between the variable-factor bidirectional DC/DC converter CNV3 and the fixed-factor bidirectional DC/DC converter CNV4 has attained the value obtained by multiplying the step-up factor of the fixed-factor bidirectional DC/DC converter CNV4 by the voltage of the battery B1.

Figure 8:
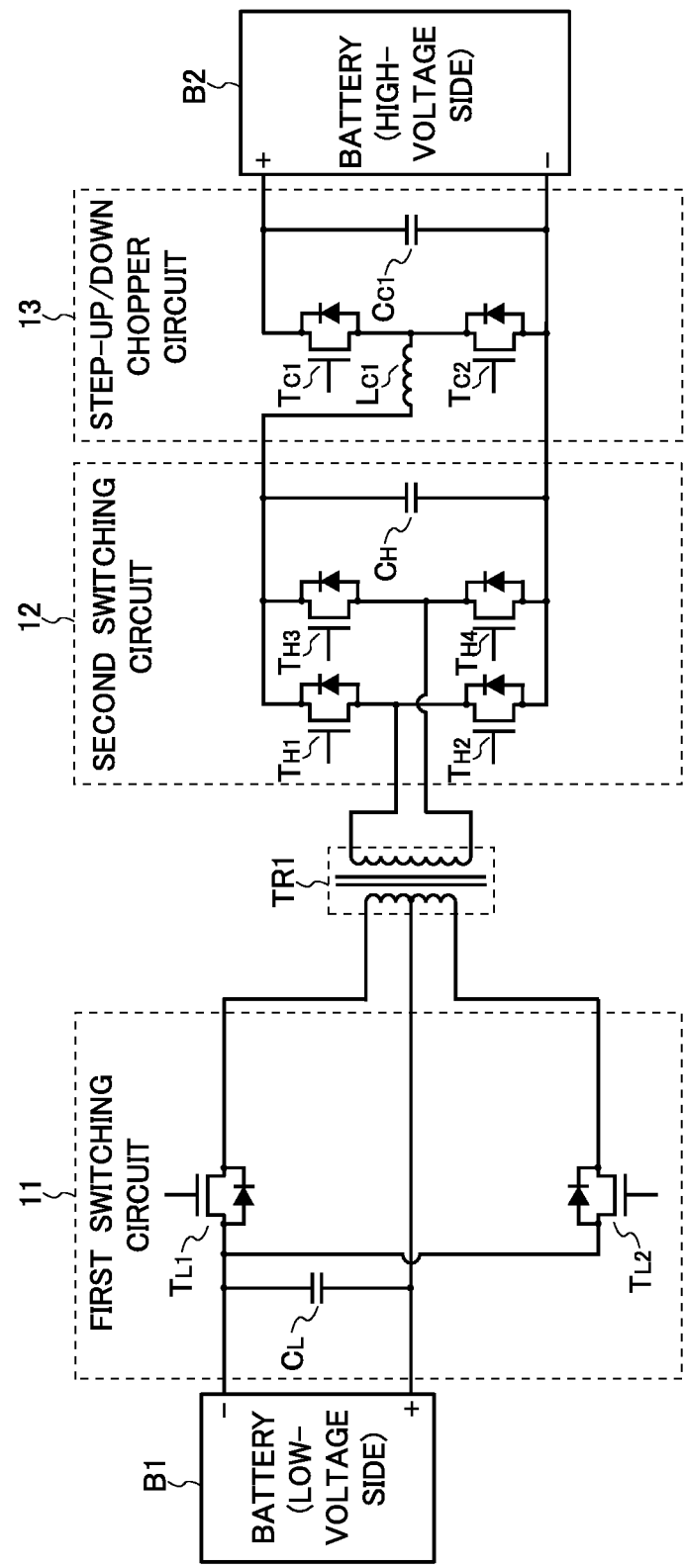
FIG. 8 illustrates an example of a configuration of the DC/DC converter as in the fifth embodiment of the present invention illustrated in FIG. 7.

FIG. 8 illustrates an example of a configuration of the DC/DC converter as in the fifth embodiment of the present invention illustrated in FIG. 7. In the configuration example illustrated in FIG. 8, a circuit constituted of a first switching circuit 11, the transformer TR1, and a second switching circuit 12 is equivalent to the fixed-factor bidirectional DC/DC converter CNV4, and a step-up/down chopper circuit 13 is equivalent to the variable-factor bidirectional DC/DC converter CNV3.

The first switching circuit 11 is provided with the capacitor $C_L$ functioning as a capacitor for smoothing during the step-down operation, and with a push-pull circuit connected to the low-voltage winding of the transformer TR1 and constituted of the transistors $T_{L1}$ and $T_{L2}$, which are N-channel MOSFETs. A drain of the transistor $T_{L1}$ is connected to one end of the low-voltage winding of the transformer TR1, a drain of the transistor $T_{L2}$ is connected to the other end of the low-voltage winding of the transformer TR1, and sources of each of the transistors $T_{L1}$ and $T_{L2}$ are connected to a negative electrode of the battery B1. A positive electrode of the battery B1 is connected to a center tap of the low-voltage winding of the transformer TR1. The capacitor $C_L$ is provided between the positive electrode and negative electrode of the battery B1.

The second switching circuit 12 is provided with a full-bridge circuit connected to the high-voltage winding of the transformer TR1 and constituted of transistors $T_{H1}$ to $T_{H4}$, which are N-channel MOSFETs, the capacitor $C_H$ functioning as a capacitor for smoothing during the step-up operation. The source of the transistor $T_{H1}$ and the drain of the transistor $T_{H2}$ are connected to one end of the high-voltage winding of the transformer TR1, and the source of the transistor $T_{H3}$, the drain of the transistor $T_{H4}$ are connected to the other end of the high-voltage winding of the transformer TR1. The drain of the transistor $T_{H1}$ and the drain of the transistor $T_{H3}$ are connected to one end of a capacitor $C_H$. A source of the transistor $T_{H2}$ and a source of the transistor $T_{H4}$ are connected to the other end of the capacitor $C_H$.

The step-up/down chopper circuit 13 is constituted of transistors $T_{C1}$ and $T_{C2}$, which are N-channel MOSFETs; an inductor $L_{C1}$; and a capacitor $C_{C1}$. The transistor $T_{C1}$ operates as a synchronous rectifier element when the battery B2 is to be charged from the battery B1, and the transistor $T_{C2}$ operates as a synchronous rectifier element when the battery B1 is to be charged from the battery B2. The synchronous rectifier element may also maintain an "off" state and allow only a (parasitic) diode connected in parallel to the synchronous rectifier element to operate.

A diode (hereinafter called "a parallel diode") is connected in parallel between the source and drain of each of the transistors, and this parallel diode may also be, inter alia, a parasitic diode (built-in diode) of each of the transistors, or a diode connected in parallel on the outside.

During the step-up operation, the DC/DC converter as in the fifth embodiment of the present invention in the configuration example illustrated in FIG. 8 carries out the DC/DC conversion by converting the direct current voltage outputted from the battery B1 to an alternating current voltage with the push-pull circuit, stepping up the alternating current voltage using the transformer TR1, and rectifying same using the transistors $T_{H1}$ and $T_{H2}$; the voltage having undergone the DC/DC conversion is further stepped up with the step-up/down chopper circuit 13 and supplied to the battery B2.

During the step-down operation, the DC/DC converter as in the fifth embodiment of the present invention in the configuration example illustrated in FIG. 8 carries out the DC/DC conversion by stepping down the direct current voltage outputted from the battery B2 with a DC/DC conversion by the step-up/down chopper circuit 13, converting the direct current voltage to an alternating current voltage with the full-bridge circuit, stepping down the alternating current voltage with the transformer TR1, and rectifying same using the transistors $T_{L1}$ and $T_{L2}$; the voltage having undergone the DC/DC conversion is supplied to the battery B1.

Figure 9:
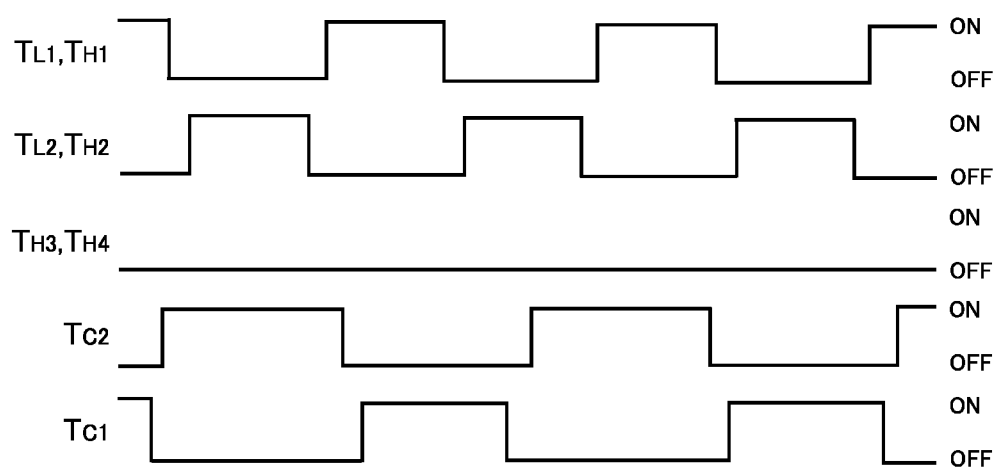
FIG. 9 is a timing chart illustrating an example of timing for switching between ON and OFF for respective transistors of the DC/DC converter as in the fifth embodiment of the present invention in the configuration example illustrated in FIG. 8, during a step-up operation.
Figure 10:
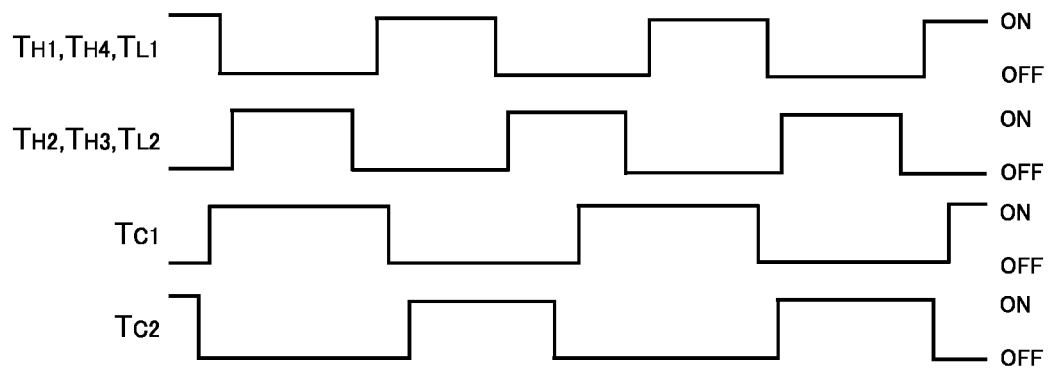
FIG. 10 is a timing chart illustrating an example of timing for switching between ON and OFF for respective transistors of the DC/DC converter as in the fifth embodiment of the present invention in the configuration example illustrated in FIG. 8, during a step-down operation.

FIG. 9 illustrates an example of timing for switching between ON and OFF for the respective transistors of the DC/DC converter as in the fifth embodiment of the present invention in the configuration example illustrated in FIG. 8, during a step-up operation, and FIG. 10 illustrates an example of timing for switching between ON and OFF for the respective transistors of the DC/DC converter as in the fifth embodiment of the present invention in the configuration example illustrated in FIG. 8, during a step-down operation.

In the timing example illustrated in FIG. 9, the transistors $T_{H1}$, $T_{H2}$, and $T_{C1}$ are operated as synchronous rectifier elements. In the timing example illustrated in FIG. 10, the transistors $T_{L1}$, $T_{L2}$, and $T_{C2}$ are operated as synchronous rectifier elements. The step-up/down chopper circuit 13 carries out the step-up by a switching operation of the transistor $T_{C2}$. During this step-up operation, the transistor $T_{C1}$ is turned on in accordance with the timing whereby current flows to the parallel diode of the transistor $T_{C1}$, and loss commensurate with a diode is reduced by carrying out a synchronous rectification. The step-up/down chopper circuit 13 also carries out a step-down by a switching operation of the transistor $T_{C1}$. During this step-down operation, the transistor $T_{C2}$ is turned on in accordance with the timing whereby current flows to the parallel diode of the transistor $T_{C2}$, and loss commensurate with a diode is reduced by carrying out a synchronous rectification. During both the step-up operation and the step-down operation, a time period where the transistor $T_{C1}$ is turned on and a time period where the transistor $T_{C2}$ is turned on are repeated in alternation, but a dead time is also provided in order to prevent the transistors $T_{C1}$ and $T_{C2}$ from being turned on simultaneously. In the present embodiment, loss commensurate with passage through a diode element is reduced using simultaneous rectification, but simultaneous rectification is not necessarily required; in a case where the current flowing to the step-up/down chopper circuit 13 is sufficiently small, it would also be possible, without carrying out the simultaneous rectification, to have the transistor $T_{C1}$ be off at all times and carry out the switching operation of only the transistor $T_{C2}$ during the step-up operation, and to have the transistor $T_{C2}$ be off at all times and carry out the switching operation of only the transistor $T_{C1}$ during the step-down operation.

In the timing examples illustrated in FIGS. 9 and 10, there are mutually different settings for the operating frequency of the step-up/down chopper circuit 13 and the operating frequency of the circuit constituted of the first switching circuit 11, the transformer TR1, and the second switching circuit 12. According to the setting of such description, it is possible to operate at the respective most efficient operating frequency in the step-up/down chopper circuit 13 (equivalent to the variable-factor bidirectional DC/DC converter CNV3) and in the circuit constituted of the first switching circuit 11, the transformer TR1, and the second switching circuit 12 (equivalent to the fixed-factor bidirectional DC/DC converter CNV4); and the overall efficiency of the DC/DC converter as in the fifth embodiment of the present invention can be even further enhanced.

The description shall now relate to preferred configuration examples of the fixed-factor bidirectional DC/DC converter CNV4. For convenience, the description shall be provided in a form where the batteries B1 and B2 are connected to the fixed-factor bidirectional DC/DC converter CNV4. More specifically, a description relating to the variable-factor bidirectional DC/DC converter CNV3 has been omitted, and the step-up/down factor of the variable-factor bidirectional DC/DC converter CNV3 is assumed to be a factor of 1.

Figure 11A:
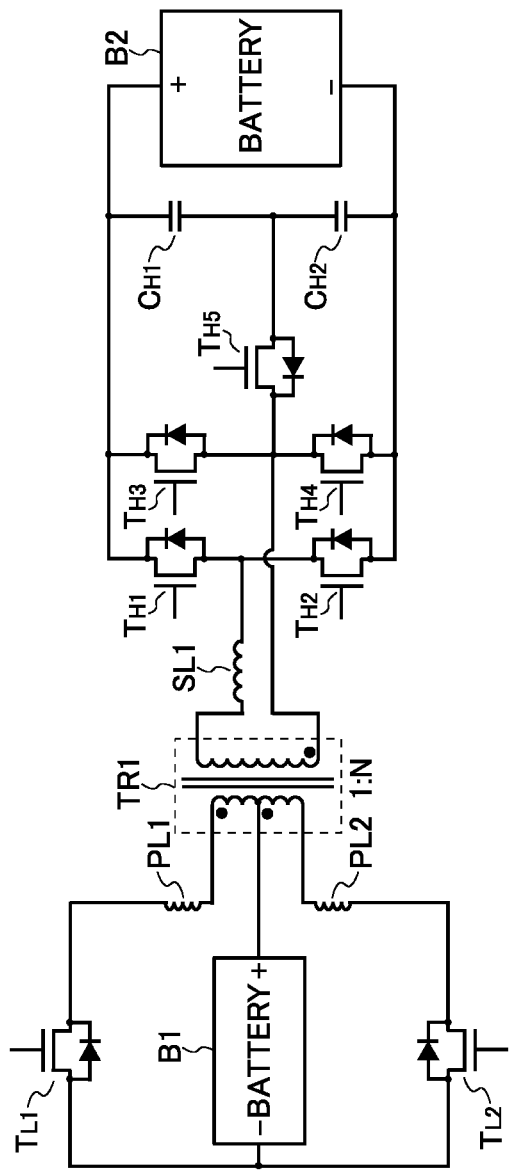
FIG. 11A illustrates a configuration of a fixed-factor bidirectional DC/DC converter as in a first preferred configuration example.

FIG. 11A illustrates the configuration of the fixed-factor bidirectional DC/DC converter as in the first preferred configuration example. The fixed-factor bidirectional DC/DC converter as in the first preferred configuration example illustrated in FIG. 11A is provided with: a push-pull circuit constituted of the transistors $T_{L1}$ and $T_{L2}$, which are N-channel MOSFETs, and are connected to the low-voltage winding of the transformer TR1; the transformer TR1, for which the winding ratio (the turn ratio of the low-voltage winding and the high-voltage winding) is 1:N; a full-bridge circuit constituted of the transistors $T_{H1}$ to $T_{H4}$, which are N-channel MOSFETs, and connected to the high-voltage winding of the transformer TR1; the transistor $T_{H5}$, which is an N-channel MOSFET provided between the full-bridge circuit and the battery B2; and capacitors $C_{H1}$ and $C_{H2}$.

The drain of the transistor $T_{L1}$ is connected to one end of the low-voltage winding of the transformer TR1, and the drain of the transistor $T_{L2}$ is connected to the other end of the low-voltage winding of the transformer TR1; the respective sources of the transistors $T_{L1}$ and $T_{L2}$ are connected to the negative electrode of the battery B1. The positive electrode of the battery B1 is connected to the center tap of the low-voltage winding of the transformer TR1. A capacitor may also be provided between the positive electrode and negative electrode of the battery B1 and made to function as a capacitor for smoothing during the step-down operation.

Figure 11B:
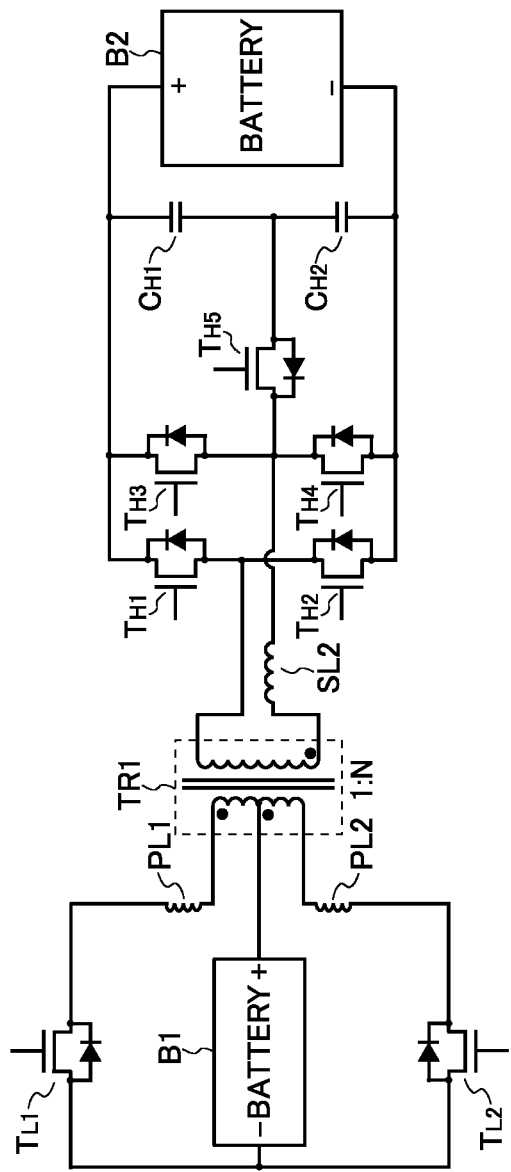
FIG. 11B illustrates a modification example of the fixed-factor bidirectional DC/DC converter as in the first preferred configuration example.

The source of the transistor $T_{H1}$ and the drain of the transistor $T_{H2}$ are connected to one end of the high-voltage winding of the transformer TR1, and the source of the transistor $T_{H3}$, the drain of the transistor $T_{H4}$, and the drain of the transistor $T_{H5}$ are connected to the other end of the high-voltage winding of the transformer TR1. The drain of the transistor $T_{H1}$, the drain of the transistor $T_{H3}$, and one end of the capacitor $C_{H1}$ are connected to a positive electrode of the battery B2, and the source of the transistor $T_{H2}$, the source of the transistor $T_{H4}$, and one end of the capacitor $C_{H2}$ are connected to a negative electrode of the battery B2. The other end of the capacitor $C_{H1}$ and the other end of the capacitor $C_{H2}$ are connected to the source of the transistor $T_{H5}$. The diodes between the sources and drains of each of the transistors are parallel diodes. The battery B2 is a higher-voltage battery than is the battery B1. Inductors PL1, PL2, SL1 are parasitic inductors of the transformer TR1. The inductor SL1 may also include an external inductor (different from a parasitic inductor of the transformer TR1) connected to the transformer TR1. In such a case, the inductance of the inductor SL1 could be adjusted to change the control range of the output voltage. Similarly, it would also be possible to connect the inductors PL1, PL2 to an external inductor to change the control range of the output voltage, but this is not preferable because a surge generated when the transistors $T_{L1}$, $T_{L2}$ are turned off will have an even greater amount of energy. By contrast, the current flowing through the inductor SL1 located on a high-voltage side will be relatively small, and thus is less susceptible to the impact of the surge. More specifically, in a case where an inductor is added in order to change the control range of the output voltage, this is preferably carried out with respect to the inductor SL1. An inductor SL2 may also be provided, as illustrated in FIG. 11B, instead of the inductor SL1.

The fixed-factor bidirectional DC/DC converter as in the first preferred configuration example illustrated in FIG. 11A carries out the DC/DC conversion during the step-up operation by turning on the transistor $T_{H5}$ at all times, converting the direct current voltage outputted from the battery B1 to an alternating current voltage with the push-pull circuit, stepping up the alternating current voltage using the transformer TR1, and rectifying same using a voltage doubling rectifier circuit constituted of the transistors $T_{H1}$ and $T_{H2}$, transistor $T_{H5}$, and the capacitors $C_{H1}$ and $C_{H2}$; the voltage having undergone the DC/DC conversion is supplied to the battery B2. Because the winding ratio of the transformer TR1 (the turn ratio of the low-voltage winding and the high-voltage winding) is 1:N, the fixed step-up factor in the bidirectional DC/DC converter as in the first preferred configuration example (excluding a voltage change by the inductors PL1, PL2, SL1) is a factor of 2N. Changing the duty of the gate drive voltage of the transistors $T_{L1}$ and $T_{L2}$ makes it possible to change the rate of change of a current i flowing to the parasitic inductor (di/dt) (>0) and to control the output voltage and the output current.

The fixed-factor bidirectional DC/DC converter as in the first preferred configuration example illustrated in FIG. 11A carries out the DC/DC conversion during the step-down operation by turning the transistor $T_{H5}$ off at all times, converting the direct current voltage outputted from the battery B2 to an alternating current voltage with the full-bridge circuit, stepping down the alternating current voltage using the transformer TR1, and rectifying same using the transistors $T_{L1}$ and $T_{L2}$; the voltage having undergone the DC/DC conversion is supplied to the battery B1. Because the turn ratio (winding ratio) of the low-voltage winding and high-voltage winding of the transformer TR1 is 1:N, the fixed step-down factor (excluding the effect of the parasitic inductor) of the bidirectional DC/DC converter as in the first preferred configuration example is a factor of 1/N. Changing the duty of the gate drive voltage of the transistors $T_{H1}$, $T_{H2}$, $T_{H3}$, and $T_{H4}$ makes it possible to change the rate of change of the current i flowing to the parasitic inductor (di/dt) (>0) and to control the output voltage and the output current.

Figure 12:
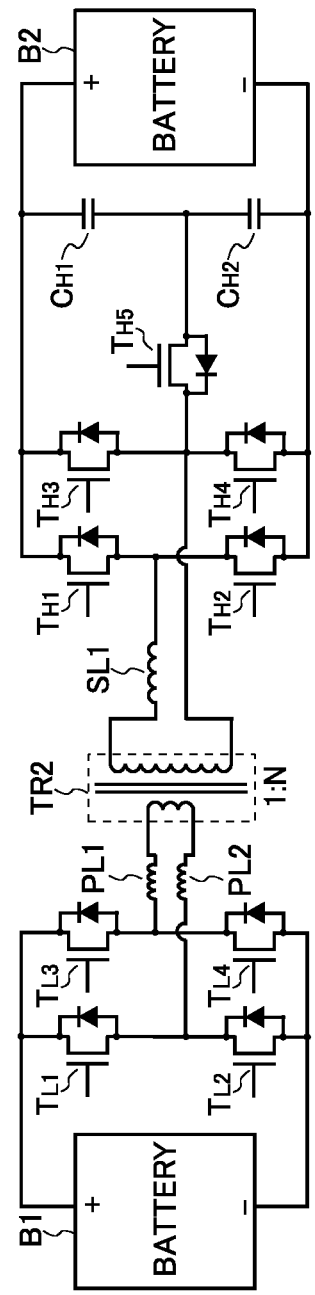
FIG. 12 illustrates a configuration of a fixed-factor bidirectional DC/DC converter as in a second preferred configuration example.

In the fixed-factor bidirectional DC/DC converter as in the first preferred configuration example illustrated in FIG. 11A, a circuit provided between the battery B1 and the low-voltage winding of the transformer is made to be a push-pull circuit, but the circuit provided between the battery B1 and the low-voltage winding of the transformer is not limited to being a push-pull circuit; for example, as with the fixed-factor bidirectional DC/DC converter as in the second preferred configuration example shown in FIG. 12, the circuit provided between the battery B1 and the low-voltage winding of the transformer may also be a full-bridge circuit constituted of the transistors $T_{L1}$ to $T_{L4}$, which are N-channel MOSFETs. Portions in FIG. 12 which are identical to those in FIG. 11A have been assigned identical reference numerals, and a more detailed description thereof has been omitted.

In the fixed-factor bidirectional DC/DC converter as in the second preferred configuration example illustrated in FIG. 12, too, the parallel diodes are connected to the sources and drains of each of the transistors, similarly with respect to the fixed-factor bidirectional DC/DC converter as in the first preferred configuration example illustrated in FIG. 11A. Also, in the fixed-factor bidirectional DC/DC converter as in the second preferred configuration example illustrated in FIG. 12, a transformer TR2 (a transformer in which no center tap has been provided to the low-voltage winding) is used instead of the transformer TR1 (a transformer in which a center tap has been provided to the low-voltage winding) used in the fixed-factor bidirectional DC/DC converter as in the first preferred configuration example illustrated in FIG. 11A. In the transformer TR2, too, the turn ratio of the low-voltage winding and the high-voltage winding is 1:N, similarly with respect to the transformer TR1.

There follows a description in regard to why the fixed step-up factor of the fixed-factor bidirectional DC/DC converter as in the preferred configuration examples is greater than the multiplicative inverse of the fixed step-down factor.

For example, let Vsub be the voltage of the battery B1, let Vsub_min (a minimum) to Vsub_max (a maximum) be the voltage range thereof, let Vmain be the voltage of the battery B2, let Vmain_min (a minimum) to Vmain_max (a maximum) be the voltage range thereof; let a be a fixed step-up factor which is not dependent on the duty determined by the low-voltage winding and high-voltage winding of the transformer and the like, let 1/β be a fixed step-down voltage which is not dependent on the duty determined by the winding ratio of the transformer and the like, let L be the equivalent inductance (as installed on the transformer high-voltage side) equivalent to the total parasitic inductance of the transformer, and let I be the current flowing to the high-voltage winding of the transformer.

In such a case, the relationship $$V\text{main}=\alpha V\text{sub}-L(dI/dt)$$

holds true during the step-up operation.

In order to reduce the switching loss, where the switching of the transistors $T_{L1}$, $T_{L2}$ is zero-current switching (or alternatively is switching at a sufficiently low current value), then (dI/dt) when either the transistor $T_{L1}$ or $T_{L2}$ is in an "on" state is positive, and thus the relationship $$V\text{main}=\alpha V\text{sub}-L(dI/dt)<\alpha V\text{sub}$$

holds true. When consideration is given to the voltage ranges of the battery B1 and the battery B2, it is necessary to choose the fixed step-up factor (for example, the winding ratio of the transformer) so that $$V\text{main\_max}<\alpha V\text{sub\_min} \qquad \text{(Equation 1).}$$

Next, during the step-down operation, the relationship $$V\text{sub}=(1/\beta)\{V\text{main}-L(dI/dt)\}$$

holds true.

In order to reduce the switching loss, where the switching for reversing the orientation of the voltage created at the transformer terminals from among the switching of the transistors $T_{H1}$, $T_{H2}$, $T_{H3}$, and $T_{H4}$ is zero-current switching (or alternatively is switching at a sufficiently low current value), then (dI/dt) when the transistors $T_{H1}$ and $T_{H4}$ are in an "on" state ("off" state) and the transistors $T_{H2}$ and $T_{H3}$ are in an "off" state ("on" state) is positive, and thus the relationship $$V\text{sub}=(1/\beta)\{V\text{main}-L(dI/dt)\}<(1/\beta)V\text{main}$$

holds true. When consideration is given to the voltage ranges of the battery B1 and the battery B2, it is necessary to choose the fixed step-down factor (for example, the winding ratio of the transformer) so that $$V\text{sub\_max}<(1/\beta)V\text{main\_min} \qquad \text{(Equation 2)}$$

holds true.

In the bidirectional DC/DC converter, because it is necessary for both Equation 1 and Equation 2 to be satisfied at the same time, a relationship $$V\text{sub\_max}<(1/\beta)V\text{main\_min}<(\alpha/\beta)V\text{sub\_min} \therefore (\alpha/\beta)> (V\text{sub\_max}/V\text{sub\_min})>1 \qquad \text{(Equation 3)}$$

holds true, in the light of Equation 1 and Equation 2. When the fixed step-up factor α and the fixed step-down factor (1/β) are determined merely from the winding ratio of the transformer, it is necessary to employ a turn ratio that varies during step-up and during step-up, where, inter alia, the winding ratio of the transformer during step-up is 1:α and the winding ratio of the transformer during step-down is 1:β(<α), and the circuitry configuration becomes very complicated. However, in the circuit in FIG. 11A, because the winding ratio of the transformer TR1 is 1:N, this is equivalent to a case where α=2N and β=N, and Equation 3 is satisfied. More specifically, the circuit in FIG. 11A does not require the winding ratio of the transformer to be altered during step-up and during step-down, and thus a bidirectional DC/DC converter can be constituted of a simple circuitry configuration.

Figure 13:
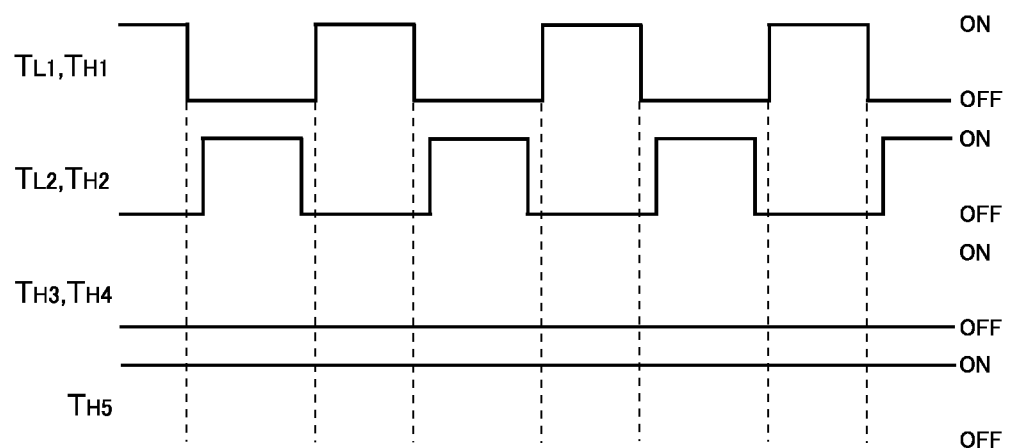
FIG. 13 is a timing chart illustrating the timing for switching between ON and OFF for respective transistors of the fixed-factor bidirectional DC/DC converter as in the first preferred configuration example, during a step-up operation.

FIG. 13 illustrates a timing chart illustrating the timing for switching between ON and OFF for each of the transistors of the fixed-factor bidirectional DC/DC converter as in the first preferred configuration example, during the step-up operation.

Figure 14:
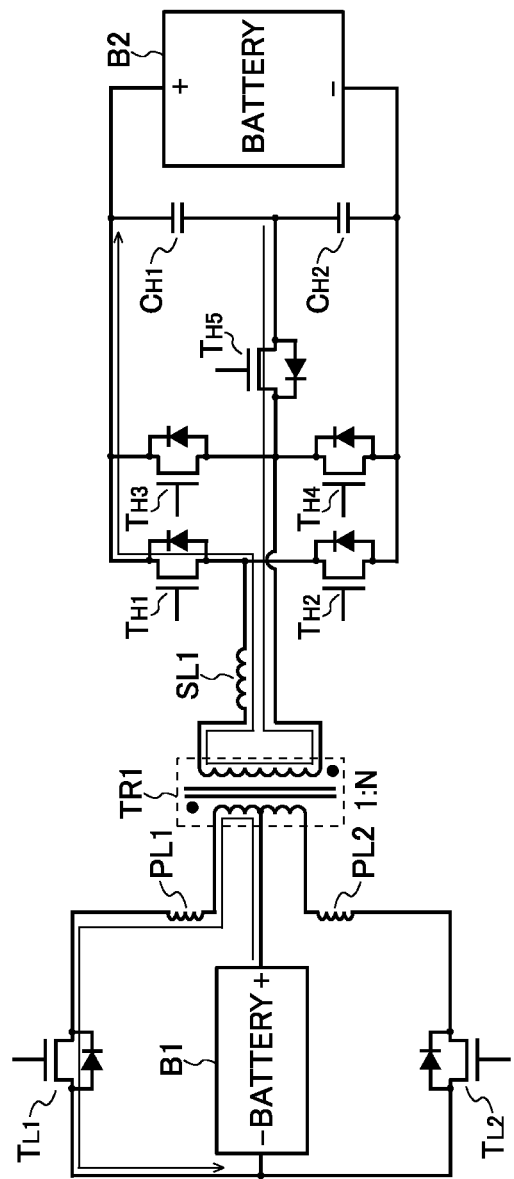
FIG. 14 illustrates an electrical current pathway of the fixed-factor bidirectional DC/DC converter as in the first preferred configuration example, during a step-up operation.

When the transistor $T_{L1}$ is turned on and a current is allowed to flow to the low-voltage winding of the transformer TR1, an electromotive force is generated at the high-voltage winding of the transformer TR1, and a current passing through the transistors $T_{H5}$ and $T_{H1}$ begins to flow (see FIG. 14). At this time, the transistor $T_{H1}$ is turned on and synchronous rectification is carried out, in accordance with the timing where the current flows to the parasitic diode of the transistor $T_{H1}$, whereby loss commensurate with a diode is reduced. Similarly, when the transistor $T_{L2}$ is turned on and a current is allowed to flow to the low-voltage winding of the transformer TR1, an electromotive force is generated at the high-voltage winding of the transformer TR1, and a current passing through the transistors $T_{H2}$ and $T_{H5}$ begins to flow. At this time, the transistor $T_{H2}$ is turned on and synchronous rectification is carried out, in accordance with the timing where the current flows to the parallel diode of the transistor $T_{H2}$, whereby loss commensurate with a diode is reduced. This makes it possible to enhance efficiency even further.

The time period when the transistor $T_{L1}$ is turned on and the time period when the transistor $T_{L2}$ is turned on are repeated in alternation, but a large short-circuit current begins to flow when the transistors $T_{H1}$ and $T_{H2}$ are turned on at the same time, and thus in order to prevent the transistors $T_{H1}$ and $T_{12}$ from being turned on at the same time, a time (a dead time) is provided where both the transistors $T_{H1}$ and $T_{H1}$ are "off." This makes it possible to enhance efficiency even further.

Figure 15:
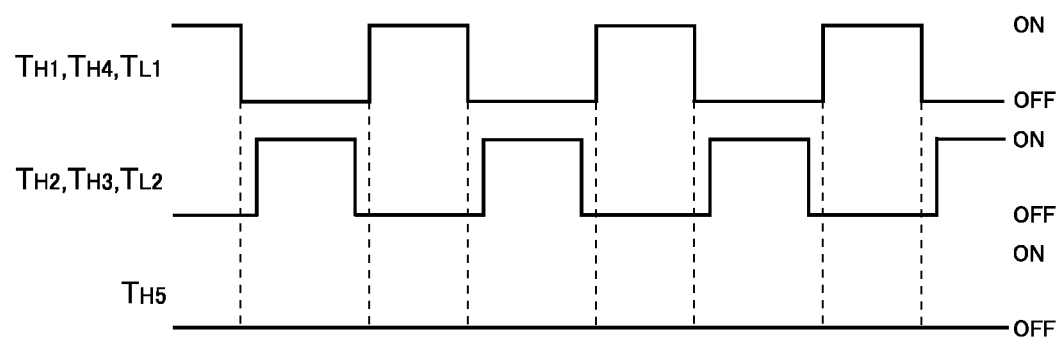
FIG. 15 is a timing chart illustrating the timing for switching between ON and OFF for respective transistors of the fixed-factor bidirectional DC/DC converter as in the first preferred configuration example, during a step-down operation.

FIG. 15 next illustrates a timing chart illustrating the timing for switching between ON and OFF for each of the transistors of the fixed-factor bidirectional DC/DC converter as in the first preferred configuration example, during the step-down operation.

Figure 16:
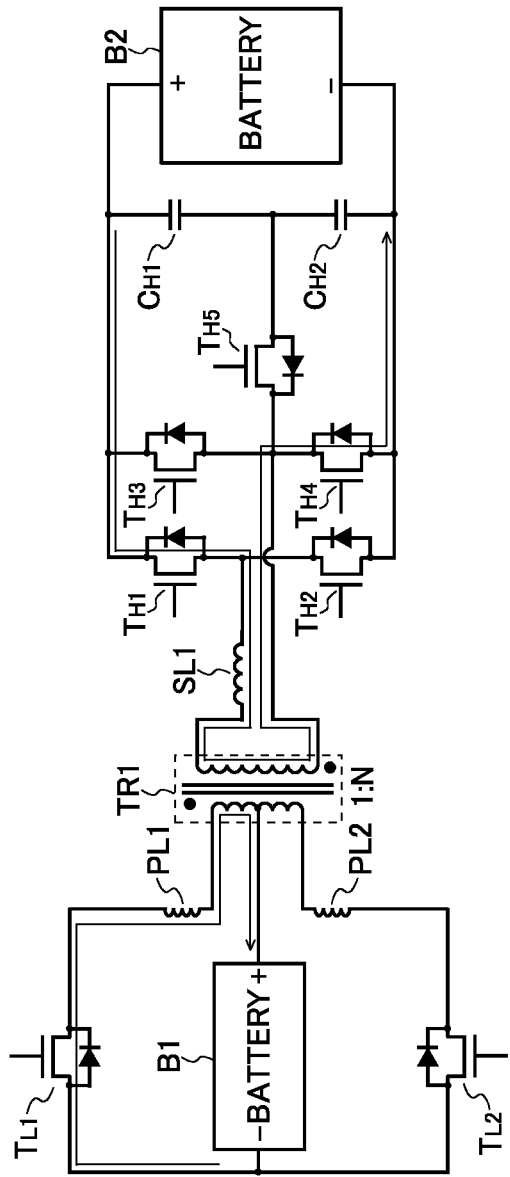
FIG. 16 illustrates an electrical current pathway of the fixed-factor bidirectional DC/DC converter as in the first preferred configuration example, during a step-down operation.

When the transistors $T_{H1}$ and $T_{H4}$ are turned on and a current is allowed to flow to the high-voltage winding of the transformer TR1, an electromotive force is generated at the low-voltage winding of the transformer TR1, and a current passing through the transistor $T_{L1}$ begins to flow (see FIG. 16). At this time, the transistor $T_{L1}$ is turned on and synchronous rectification is carried out, in accordance with the timing where the current flows to the parallel diode of the transistor $T_{L1}$, whereby loss commensurate with a diode is reduced. Similarly, when the transistors $T_{H3}$ and $T_{H2}$ are turned on and a current is allowed to flow to the high-voltage winding of the transformer TR1, an electromotive force is generated at the low-voltage winding of the transformer TR1, and a current passing through the transistor $T_{L2}$ begins to flow. At this time, the transistor $T_{L2}$ is turned on and synchronous rectification is carried out, in accordance with the timing where the current flows to the parallel diode of the transistor $T_{L2}$, whereby loss commensurate with a diode is reduced. This makes it possible to enhance efficiency even further.

The time period when the transistors $T_{H1}$ and $T_{H4}$ are turned on and the time period when the transistors $T_{H2}$ and $T_{H3}$ are turned on are repeated in alternation, but a considerable short-circuit current begins to flow when the transistors $T_{H1}$ and $T_{H2}$ are turned on at the same time, and a considerable short-circuit current begins to flow when the transistors $T_{H3}$ and $T_{H4}$ are turned on at the same time, and thus in order to prevent the transistors $T_{H1}$ and $T_{H2}$ from being turned on at the same time and to prevent the transistors $T_{H3}$ and $T_{H4}$ from being turned on at the same time, there is provided a time (a dead time) where the transistors $T_{H1}$ to $T_{H4}$ are all "off." This makes it possible to enhance efficiency even further.

In a case where the transistor $T_{H5}$ is constituted solely of a single MOS transistor, as in the fixed-factor bidirectional DC/DC converter as in the first preferred configuration example illustrated in FIG. 11A or as in the second preferred configuration example illustrated in FIG. 12, then when the transistor $T_{H4}$ is turned on in a state where the capacitor $C_{H2}$ remains charged, for example, at a time such as the start of the step-down operation, the capacitor $C_{H2}$ will short-circuit over the transistor $T_{H4}$ and the parasitic diode of the transistor $T_{H5}$, a considerable current will flow, and the capacitor $C_{H2}$, the transistor $T_{H4}$, and the transistor $T_{H5}$ will sustain damage.

Figure 17:
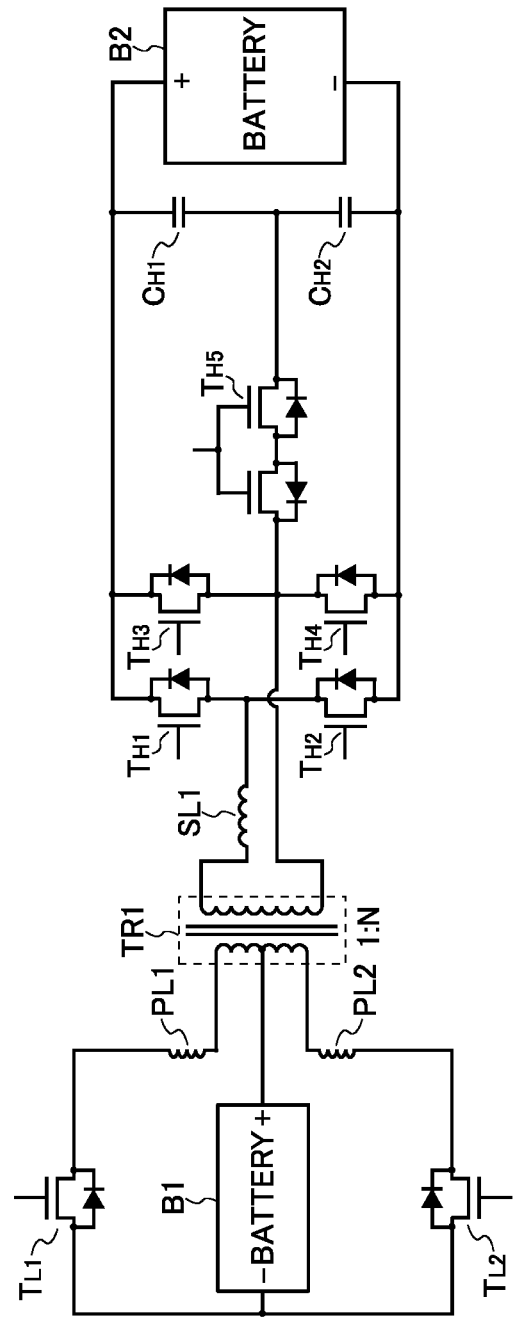
FIG. 17 illustrates a configuration of a fixed-factor bidirectional DC/DC converter as in a third preferred configuration example.
Figure 18:
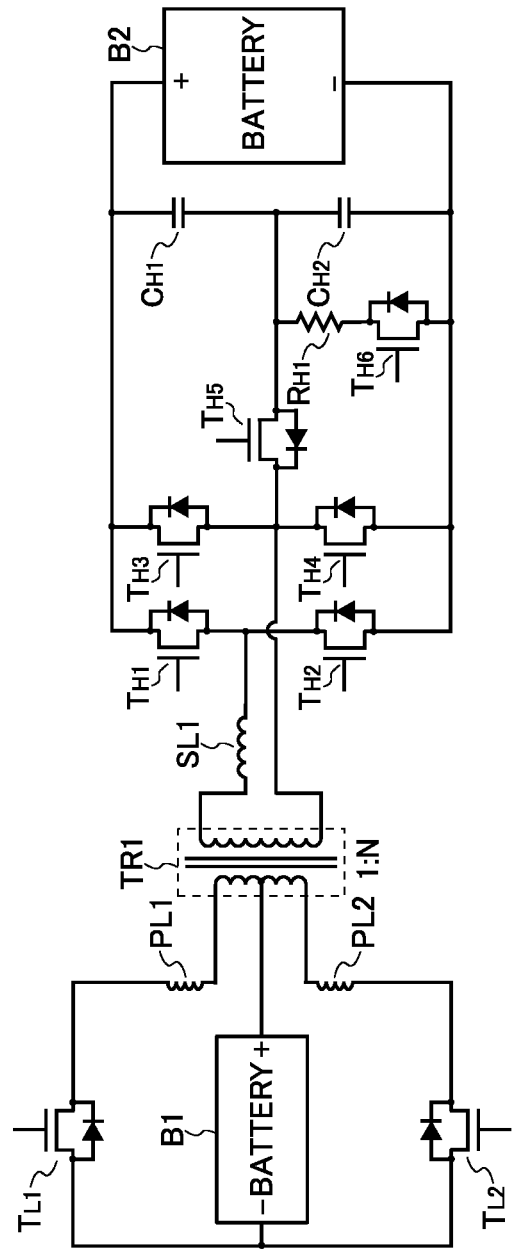
FIG. 18 illustrates a configuration of a fixed-factor bidirectional DC/DC converter as in a fourth preferred configuration example.

In view whereof, it is preferable to adopt, for example, the fixed-factor bidirectional DC/DC converter as in the third preferred configuration example illustrated in FIG. 17 or the fixed-factor bidirectional DC/DC converter as in the fourth preferred configuration example illustrated in FIG. 18. Portions in FIGS. 17 and 18 which are identical to those in FIG. 11A have been assigned identical reference numerals, and a more detailed description thereof has been omitted.

In the fixed-factor bidirectional DC/DC converter as in the third preferred configuration example illustrated in FIG. 17, the transistor $T_{H5}$ is constituted of two N-channel MOSFETS in which the sources are connected to each other and a shared gate control signal is supplied to the gates. The capacitor $C_{H2}$ thereby no longer short circuits via the built-in diode of the transistor $T_{H5}$ nor by the transistor $T_{H4}$, even when the transistor $T_{H4}$ has been turned on.

In the fixed-factor bidirectional DC/DC converter as in the fourth preferred configuration example illustrated in FIG. 18, a discharge circuit constituted of a resistor $R_{H1}$ and a transistor $T_{H6}$ is provided in parallel to the capacitor $C_{H2}$. Before the transistor $T_{H4}$ is turned on in the initial stage of step-down operation, the transistor $T_{H6}$ is turned on and discharging is carried out via the resistor $R_{H1}$ until the voltage at the two ends of the capacitor $C_{H2}$ becomes substantially 0 [V], after which the transistor $T_{H6}$ is turned off and the transistor $T_{H4}$ is then turned on. As a consequence, a considerable short-circuit electric current no longer flows even when the transistor $T_{H4}$ has been turned on and the capacitor $C_{H2}$ short-circuits via the transistor $T_{H4}$ and the built-in diode of the transistor $T_{H5}$.

Figure 19:
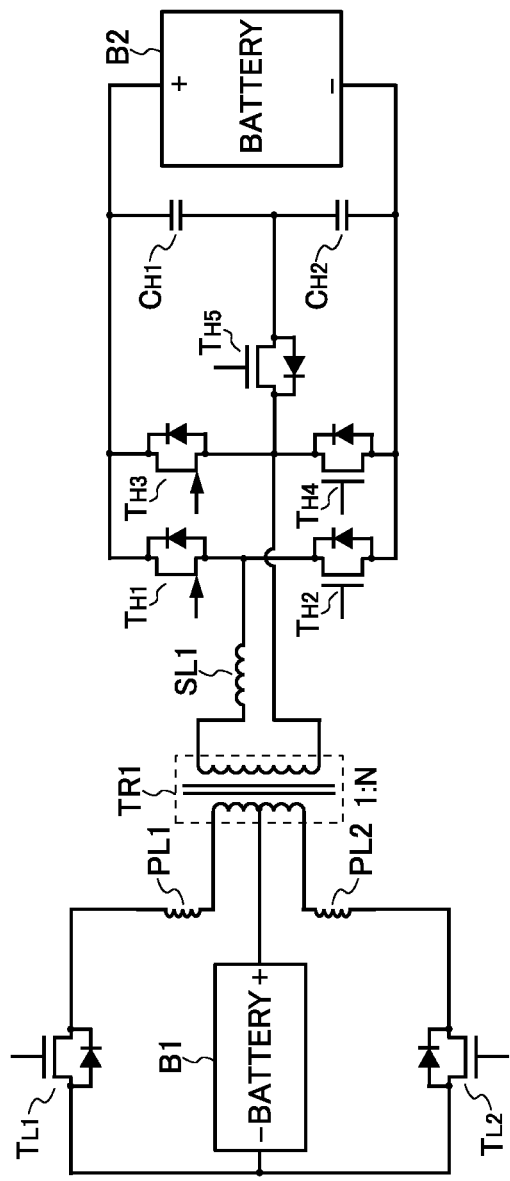
FIG. 19 illustrates a configuration of a fixed-factor bidirectional DC/DC converter as in a fifth preferred configuration example.

The description shall now relate to the fixed-factor bidirectional DC/DC converter as in the fifth preferred configuration example illustrated in FIG. 19. The fixed-factor bidirectional DC/DC converter as in the fifth preferred configuration example illustrated in FIG. 19 is characterized in that a normally-on device is used.

GaN-based transistors, SiC-based transistors, and other chemical compound power devices are characterized by a small gate capacitance and a low on-resistance, and thus are next-generation power devices expected to replace Si-based power devices. With these chemical compound power devices, it is difficult to form a low-resistance P-type active layer, wherefore normally-on N-type devices are very common at present. In a case where a normally-on device is used, there is a high likelihood that the normally-on device will reach an "on" state when a driver for driving the normally-on device has a failure, and therefore care must be taken to prevent the occurrence of a short-circuit or the like even when the driver for driving the normally-on device has a failure.

In view whereof, in the fixed-factor bidirectional DC/DC converter as in the fifth preferred configuration example illustrated in FIG. 19, a normally-on device is used for the transistors $T_{H1}$ and $T_{H3}$. This makes it possible to offer both a reduction in switching loss due to low gate capacitance in the transistor $T_{H1}$ as well as a reduction in resistance loss due to low on-resistance, and to offer both a reduction in switching loss due to low gate capacity in the transistor $T_{H3}$ as well as a reduction in resistance loss due to low on-resistance. Further, safety can be ensured even when a failure causes either the transistor $T_{H1}$ or $T_{H3}$ to have a short-circuit, because there will be no short-circuit between the positive electrode and the negative electrode of the battery B2. In the fixed-factor bidirectional DC/DC converter as in the fifth preferred configuration example illustrated in FIG. 19, a configuration is adopted in which the transistors $T_{H1}$ and $T_{H3}$ are normally-on devices and the transistors $T_{HZ}$ and $T_{H4}$ are normally-off devices, but the inverse configuration is also possible, being a configuration in which the transistors $T_{H1}$ and $T_{H3}$ are normally-off devices and the transistors $T_{H2}$ and $T_{H4}$ are normally-on devices. In a case where a chemical compound transistor is used for the normally-on devices, no built-in transistor will be formed between the source and drain when the transistor is, for example, GaN-based, and a built-in diode formed between the source and drain when the transistor is, for example, SiC-based will not have favorable performance; therefore, it is preferable to connect a diode in parallel to the normally-on devices (the transistors $T_{H1}$ and $T_{H3}$) as illustrated in FIG. 19.

Figure 20:
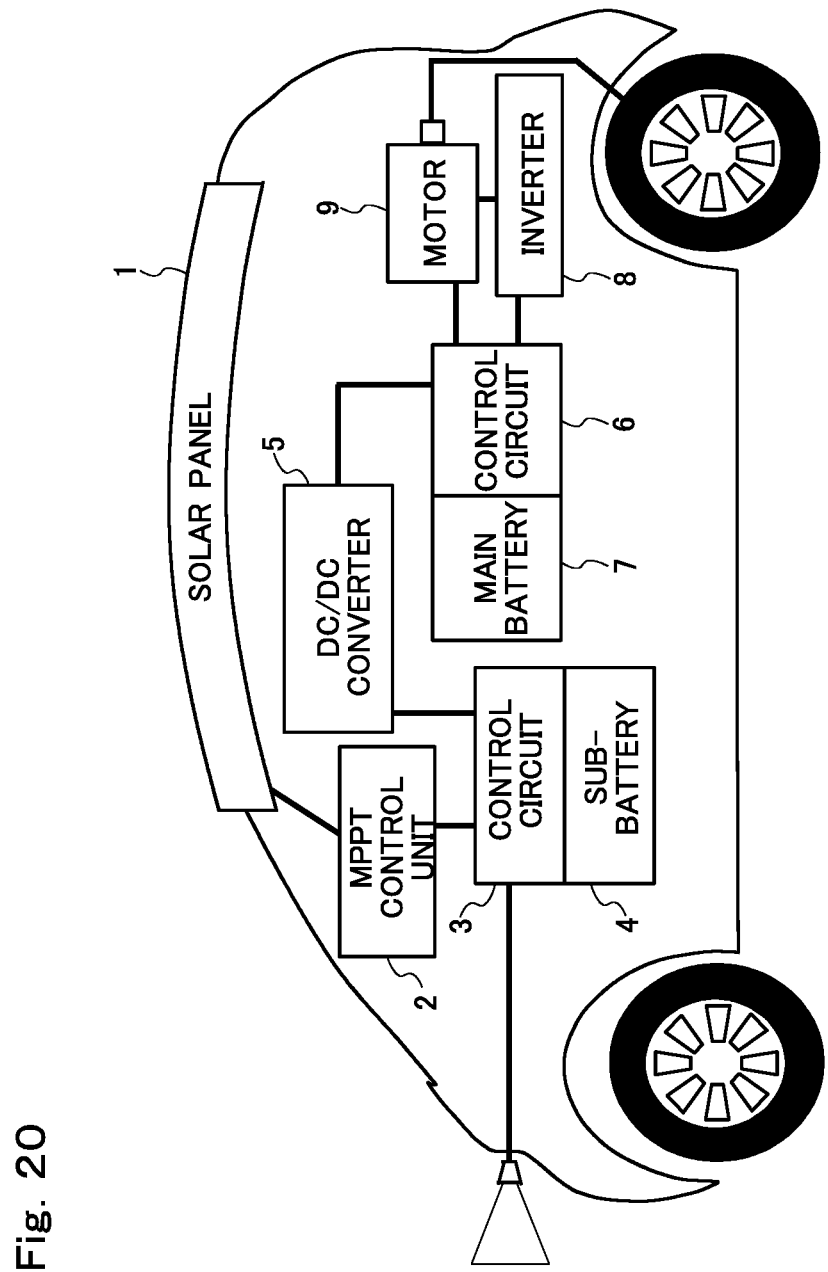
FIG. 20 illustrates a schematic configuration example of a solar charging system for an electric automotive vehicle.

The DC/DC converter as in the present invention can be applied, for example, to the solar charging system for an electric automotive vehicle illustrated in FIG. 20.

The solar charging system for an electric automotive vehicle illustrated in FIG. 20 comprises: a solar panel 1 in which a plurality of solar cells are arranged; a maximum power point tracking (MPPT) control unit 2 for controlling the output voltage of the solar panel 1, so that the output voltage of the solar panel 1 is at a maximum; a control circuit 3 for managing and controlling a sub-battery 4; the sub-battery 4, which stores the output power of the solar panel 1; a DC/DC converter 5 for carrying out a DC/DC conversion of the direct current voltage outputted from the sub-battery 4 and supplying same to a main battery 7; a control circuit 6 for managing and controlling the main battery 7; and the main battery 7, which has a greater capacitance than the sub-battery 4. Further, though not depicted in FIG. 20, there is also provided within the electric automotive vehicle a circuit (inter alia, the control circuit CNT1 or the control circuit CNT2 in the description above) for generating a control signal for controlling the "on" and "off" states of each of the switching elements inside of the DC/DC converter 5.

In the case where the DC/DC converter as in the present invention is applied to the solar charging system for an electric automotive vehicle illustrated in FIG. 20, the DC/DC converter 5 may be the DC/DC converter as in the present invention. In the case where the DC/DC converter as in the present invention is a bidirectional DC/DC converter, then it would also become possible for the direct current voltage outputted from the main battery 7 to undergo DC/DC conversion and be supplied to the sub-battery 4. In such a case, the sub-battery 4 corresponds to the battery (on the low-voltage side) B1 in the description above and the main battery 7 corresponds to the battery (on the high-voltage side) B2 in the description above.

An inverter 8 provided to the electric automotive vehicle converts the direct current voltage outputted from the main battery 7 into a motor-driving alternating current voltage. A motor 9 provided to the electric automotive vehicle is rotatably driven by the motor-driving alternating current voltage outputted from the inverter 8. The drive wheels of the electric automotive vehicle are rotated by the rotation of the motor 9. Regenerative energy generated by the motor 9 during braking of the electric automotive vehicle is recovered by the control circuit 6 and stored in the main battery 7. The direct current voltage outputted from the sub-battery 4 is also utilized as a power source for headlights and the like.

In FIG. 20, the solar charging system provided with the DC/DC converter as in the present invention is a solar charging system for an electric automotive vehicle, but it will be readily understood that it can also be used as a solar charging system for other movable bodies (for example, a motorcycle or the like).

Herein, in a case where a push-pull circuit is used for a switching circuit connected to the low-voltage winding of the transformer in the fixed-factor bidirectional DC/DC converter, it is preferable, from the standpoint of enhancing efficiency, to provide to the push-pull circuit means for suppressing a surge voltage arising due to the parasitic inductor of the low-voltage winding of the transformer.

The description below shall now relate to the means for suppressing the surge voltage.

Figure 21:
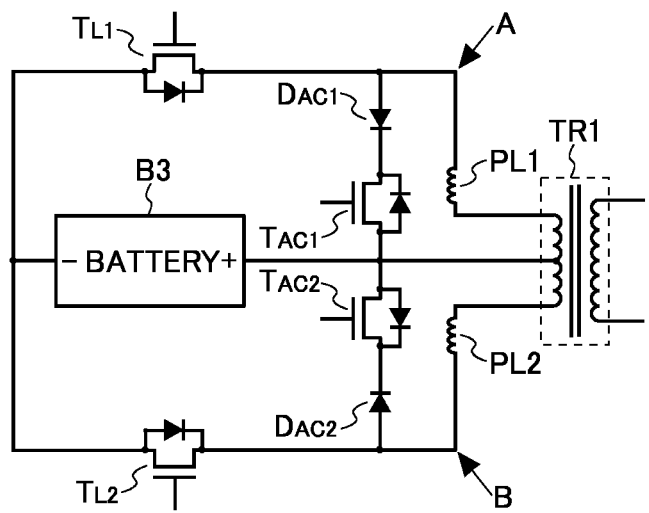
FIG. 21 illustrates a configuration of a push-pull circuit as in a first preferred example.

FIG. 21 illustrates the configuration of the push-pull circuit as in a first preferred example. The push-pull circuit as in the first preferred example illustrated in FIG. 21 is provided with: the transistors $T_{L1}$ and $T_{L2}$, which are N-channel MOSFETs; diodes $D_{AC1}$ and $D_{AC2}$; and transistors $T_{AC1}$ and $T_{AC2}$, which are N-channel MOSFETs.

The drain of the transistor $T_{L1}$ is connected to one end of the low-voltage winding of the transformer TR1, the drain of the transistor $T_{L2}$ is connected to the other end of the low-voltage winding of the transformer TR1, and the respective sources of the transistors $T_{L1}$ and $T_{L2}$ are connected to a negative electrode of a battery B3. In FIG. 21, the parasitic inductance of the low-voltage winding of the transformer TR1 is depicted as parasitic inductors PL1 and PL2. Parallel diodes are connected between the source and drain of each of the transistors, but these parallel diodes may also be, inter alia, diodes that are connected in parallel on the outside or parasitic diodes of each transistor (built-in diodes).

The anode of the diode $D_{AC1}$ is connected to the drain of the transistor $T_{L1}$, the cathode of the diode $D_{AC1}$ is connected to the drain of the transistor $T_{AC1}$, and the source of the transistor $T_{AC1}$ is connected to the center tap of the low-voltage winding of the transformer TR1 and a positive electrode of the battery B3. Similarly, the anode of the diode $D_{AC2}$ is connected to the drain of the transistor $T_{L2}$, the cathode of the diode $D_{AC2}$ is connected to the drain of the transistor $T_{AC2}$, and the source of the transistor $T_{AC2}$ is connected to the center tap of the low-voltage winding of the transformer TR1 and the positive electrode of the battery B3.

In the push-pull circuit as in the first preferred example illustrated in FIG. 21, the transistor $T_{AC1}$ is switched between conduction and shut-off of a pathway which passes from a connection point A between the drain of the transistor $T_{L1}$ and the one end of the low-voltage winding of the transformer TR1, through the diode $D_{AC1}$, and arrives at a connection point between the positive electrode of the battery B3 and the center tap of the low-voltage winding of the transformer TR1. When a surge component arising due to the parasitic inductor PL1 of the transformer TR1 occurs when this pathway is open to conduction, then this surge component passes through the diode $D_{AC1}$ and flows back to the connection point between the positive electrode of the battery B3 and the center tap of the low-voltage winding of the transformer TR1. Similarly, in the push-pull circuit as in the first preferred example illustrated in FIG. 21, the transistor $T_{AC2}$ is switched between conduction and shut-off of a pathway which passes from a connection point B between the drain of the transistor $T_{L2}$ and the other end of the low-voltage winding of the transformer TR1, through the diode $D_{AC2}$, and arrives at the connection point between the positive electrode of the battery B3 and the center tap of the low-voltage winding of the transformer TR1. When a surge component arising due to the parasitic inductor PL2 of the transformer TR1 occurs when this pathway is open to conduction, then this surge component passes through the diode $D_{AC2}$ and flows back to the connection point between the positive electrode of the battery B3 and the center tap of the low-voltage winding of the transformer TR1.

Figure 22:
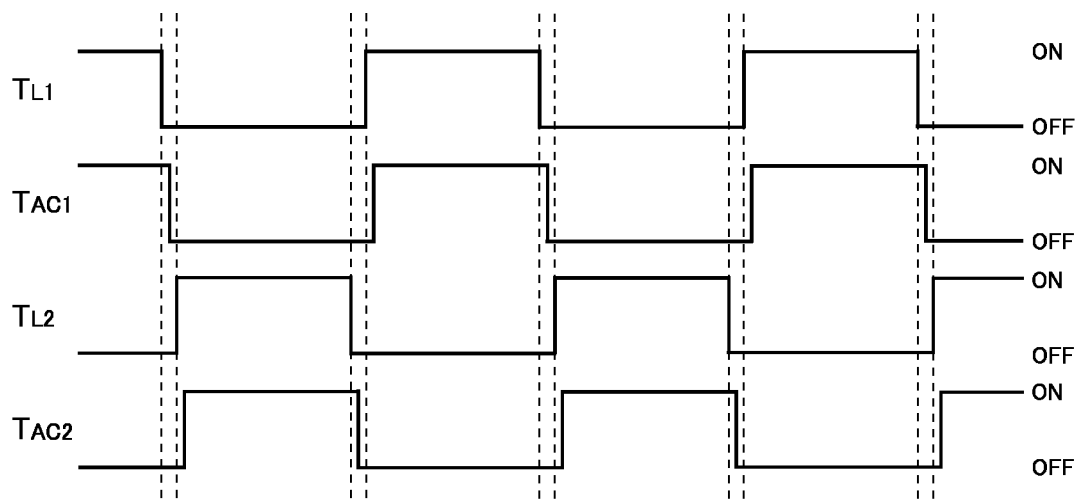
FIG. 22 is a timing chart illustrating the timing for switching between ON and OFF for respective transistors of the push-pull circuit as in the first preferred example.

It is therefore necessary for the transistor $T_{AC1}$ to be in an "on" state at a point in time where the $T_{L1}$ is switched from "on" to "off," necessary for the transistor $T_{AC1}$ to be in an "off" state at a point in time where the $T_{L2}$ is switched from "off" to "on," necessary for the transistor $T_{AC2}$ to be in an "on" state at a point in time where the $T_{L2}$ is switched from "on" to "off," and necessary for the transistor $T_{AC2}$ to be in an "off" state at a point in time where the $T_{L1}$ is switched from "off" to "on." For this reason, the switching between "on" and "off" for the transistors $T_{L1}$, $T_{L2}$, $T_{AC1}$, and $T_{AC2}$ may be carried out by a timing, for example, as illustrated in FIG. 22. In a case where the switching "on" and "off" of the transistors $T_{L1}$, $T_{L2}$, $T_{AC1}$, and $T_{AC2}$ is carried out by the timing as is illustrated in FIG. 22, then a control signal supplied to a control terminal of the transistor $T_{AC1}$ can be generated merely by delaying a control signal supplied to a control terminal of the transistor $T_{L2}$, and a control signal supplied to a control terminal of the transistor $T_{AC2}$ can be generated merely by delaying a control signal supplied to a control terminal of a transistor $T_{L2}$; therefore, the control signal supplied to the control terminal of the transistor $T_{AC1}$ and the control signal supplied to the control terminal of the transistor $T_{AC2}$ can be easily generated.

Figure 23:
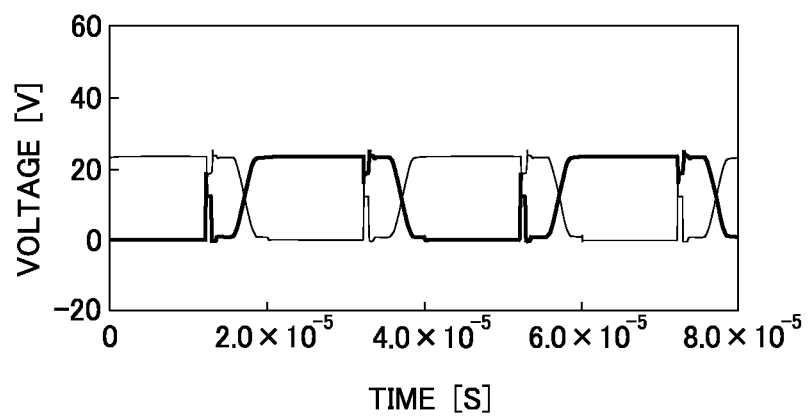
FIG. 23 illustrates a result from when the voltage of a connection point A and the voltage of a connection point B in the push-pull circuit as in the first preferred example were found by simulation.
Figure 24:
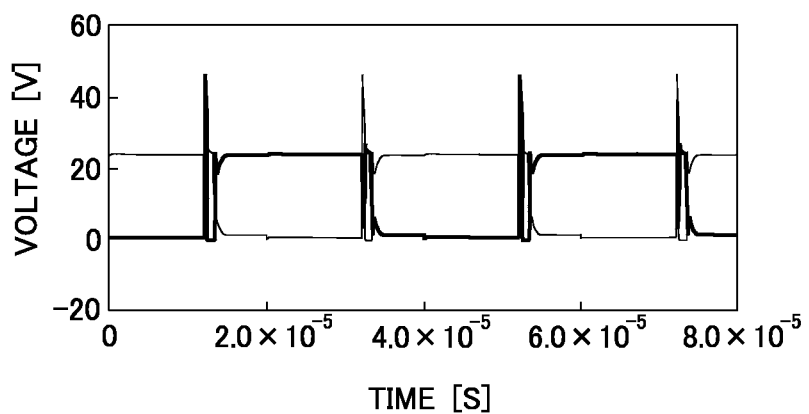
FIG. 24 illustrates a result from when the voltage of a connection point A and the voltage of a connection point B in a push-pull circuit having a conventional surge voltage suppressing means illustrated in FIG. 30 were found by simulation.
Figure 30:
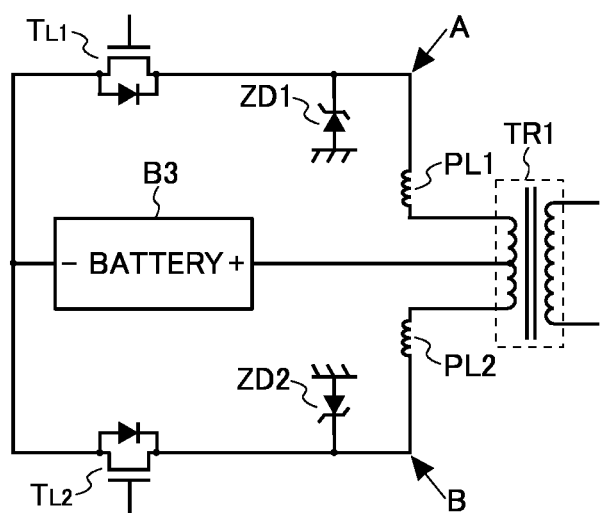
FIG. 30 illustrates a configuration example for a push-pull circuit having a conventional surge voltage suppressing means.

FIG. 23 illustrates a result from when the voltage of the connection point A and the voltage of the connection point B in the push-pull circuit as in the first preferred example shown in FIG. 21 were found by simulation. For the purpose of comparison, FIG. 24 illustrates a result from when the voltage of a connection point A and the voltage of a connection point B in a push-pull circuit having conventional surge voltage suppressing means (zener diodes ZD1, ZD2) illustrated in FIG. 30 were found by simulation. In FIGS. 23 and 24, the thick line illustrates the voltage of the connection point A, the thin line illustrates the voltage of the connection point B. In FIGS. 23 and 24, and the voltage of the battery B1 is 12 V.

According to the push-pull circuit as in the first preferred example illustrated in FIG. 21, it is possible to dramatically reduce the voltage step-up of the connecting point A arising due to the parasitic inductor PL1 of the transformer TR1 and the voltage step-up of the connecting point B arising due to the parasitic inductor PL2 of the transformer TR1. For this reason, it is possible to prevent the voltages of the connecting point A and the connecting point B from increasing beyond the withstand voltage of the transistors $T_{AC1}$ and $T_{AC2}$ and to prevent the transistors $T_{AC1}$ and $T_{AC2}$ from being destroyed. Also, according to the push-pull circuit as in the first preferred example illustrated in FIG. 21, the surge component arising due to the parasitic inductors PL1 and PL2 of the transformer TR1 is not discarded to the exterior of the circuit, but is rather made to flow back through the electric current pathway through the connecting point A, the diode $D_{AC1}$, the transistor $T_{AC1}$, the center tap of the transformer TR1, the parasitic inductor PL1, and the connecting point A; or the electric current pathway through the connecting point B, the diode $D_{AC2}$, the transistor $T_{AC2}$, the center tap of the transformer TR1, the parasitic inductor PL2, and the connecting point B, in the stated orders. The energy having been stored in the parasitic inductors PL1, PL2 can therefore be transferred to the high-voltage side (without being consumed by zener diodes or the like), and loss can accordingly be considerably reduced.

The description shall now relate to power source configuration examples of a driver for driving the transistors $T_{AC1}$ and $T_{AC2}$.

Figure 25:
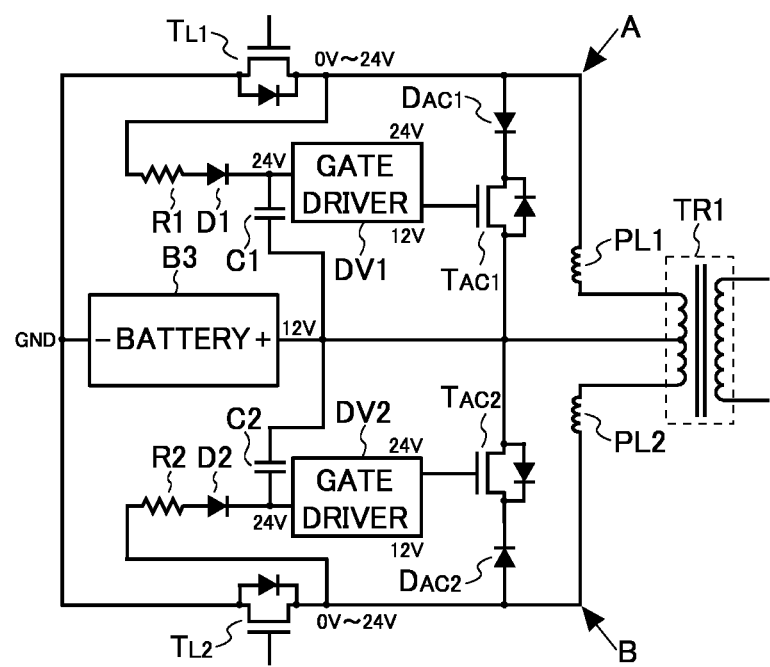
FIG. 25 illustrates a first working example of a power source configuration of a transistor-driving driver.

FIG. 25 illustrates the first working example of a power source configuration for a driver for driving the transistors $T_{AC1}$ and $T_{AC2}$. Portions in FIG. 25 which are identical to those in FIG. 21 have been assigned identical reference numerals, and a more detailed description thereof has been omitted. The voltage value stated in FIG. 25 is an example.

In the first working example illustrated in FIG. 25, the transistors $T_{AC1}$ and $T_{AC2}$ are each normally-off transistors. In an exemplary case where the voltage of the battery B1 is 12 V, a gate driver DV1 for driving the transistor $T_{AC1}$ requires a power source (for example, a 24-V power source) of a voltage found by adding a voltage greater than a threshold voltage value of the transistor $T_{AC1}$ to a source voltage (for example, 12 V) of the transistor $T_{AC1}$, and a gate driver DV2 for driving the transistor $T_{AC2}$ requires a power source (for example, a 24-V power source) of a voltage found by adding a voltage greater than a threshold voltage value of the transistors $T_{AC2}$ to a source voltage (for example, 12 V) of the transistor $T_{AC2}$. In view whereof, in the first working example illustrated in FIG. 25, there is connected to the gate driver DV1 a power source (for example, a 24-V power source) whereby a drain voltage of the transistor $T_{L1}$ passes through the resistor R1 and a reverse current-preventing diode D1 and is further smoothed by the capacitor C1 to obtain a direct current voltage, and there is connected to the gate driver DV2 a power source (for example, a 24-V power source) whereby a drain voltage of the transistor $T_{L2}$ passes through the resistor R2 and a reverse current-preventing diode D2 and is further smoothed by the capacitor C2 to obtain a direct current voltage. Also, though not depicted, there is further connected to the gate driver DV1 a power source (for example, a source terminal of the transistor $T_{AC1}$) of a voltage for turning off the transistor $T_{AC1}$, and there is also further connected to the gate driver DV2 a power source (for example, a source terminal of the transistor $T_{AC1}$) of a voltage for turning off the transistor $T_{AC2}$. Unlike the first working example in FIG. 25, it would also be possible to connect to the gate driver DV2 a power source (for example, a 24-V power source) whereby the drain voltage of the transistor $T_{L2}$ is used to obtain a direct current voltage, and possible to connect to the gate driver DV1 a power source (for example, a 24-V power source) whereby the drain voltage of the transistor $T_{L2}$ is used to obtain a direct current voltage. The reason for obtaining the power source voltage of such description for driving the transistors $T_{AC1}$, $T_{AC2}$ is that, as illustrated in FIG. 23, the drain voltage of the transistor $T_{AC1}$ when the transistor $T_{AC1}$ is off and the drain voltage of the transistor $T_{AC2}$ when the transistor $T_{AC2}$ is off are equivalent to the voltage of the battery B1 (e.g., 12 V) multiplied by a factor of approximately 2 (e.g., approximately 24 V).

According to the power source configuration of such description, there is no need to provide a special circuit (for example, a circuit for stepping up the output voltage of the battery B3 to double the voltage) for generating a voltage found by adding a voltage greater than the threshold voltage value of the transistor $T_{AC1}$ to the source voltage (for example, 12 V) of the transistor $T_{AC1}$, nor to provide a special circuit (for example, a circuit for stepping up the output voltage of the battery B3 to double the voltage) for generating a voltage found by adding a voltage greater than the threshold voltage value of the transistor $T_{AC2}$ to the source voltage (for example, 12 V) of the transistor $T_{AC2}$; the circuitry configuration therefore becomes simpler.

Figure 26:
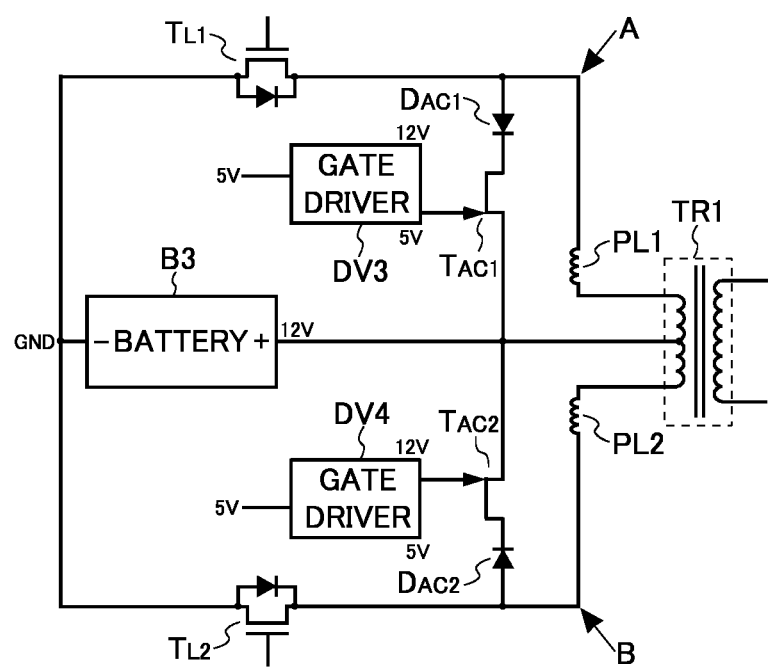
FIG. 26 illustrates a second working example of a power source configuration of a transistor-driving driver.

FIG. 26 illustrates the second working example of the power source configuration of the drivers for driving the transistors $T_{AC1}$ and $T_{AC2}$. Portions in FIG. 26 which are identical to those in FIG. 21 have been assigned identical reference numerals, and a more detailed description thereof has been omitted. The voltage value stated in FIG. 26 is an example.

In the second working example illustrated in FIG. 26, each of the transistors $T_{AC1}$ and $T_{AC2}$ is a normally-on transistor. In this case, a gate driver DV3 for driving the transistor $T_{AC1}$ does not require a power source of a voltage greater than the source voltage (for example, 12 V) of the transistor $T_{AC1}$, nor does a gate driver DV4 for driving the transistor $T_{AC2}$ require a power source of a voltage greater than the source voltage (for example, 12 V) of the transistor $T_{AC2}$. In view whereof, in the second working example illustrated in FIG. 26, a power source (for example, a 5-V power source) for other control circuits is connected to the gate drivers DV3 and DV4. More specifically, a power source (for example, a 5-V power source) for other control circuits is shared by other control circuits (for example, sensors, drivers for driving other transistors, and the like) and by the gate drivers DV3 and DV4. Also, though not depicted, there is also connected to the gate driver DV3 a power source (for example, a 12-V power source) of a voltage for turning on the transistor $T_{AC1}$, and there is also connected to the gate driver DV4 a power source (for example, a 12-V power source) of a voltage for turning on the transistor $T_{AC2}$.

According to the power source configuration of such description, there is no need to provide a dedicated power source to the gate driver DV3 and the DV4, and therefore the number of components that constitute the power source circuitry can be reduced. Also, in the second working example illustrated in FIG. 26, loss can be further reduced by using chemical compound transistors having a lower on-resistance than an Si-based transistor, such as GaN-based transistors or SiC-based transistors, as the transistors $T_{AC1}$ and $T_{AC2}$, which herein are normally-on transistors. In the case where chemical compound transistors are used for the transistors $T_{AC1}$ and $T_{AC2}$, then because no built-in diode is formed between the source and drain with, for example, a GaN-based transistor, a diode may also be connected to a position parallel to the transistors $T_{AC1}$ and $T_{AC2}$, similarly with respect to FIG. 25, although no parallel diode of the transistors $T_{AC1}$ and $T_{AC2}$ is depicted in FIG. 26.

Figure 27:
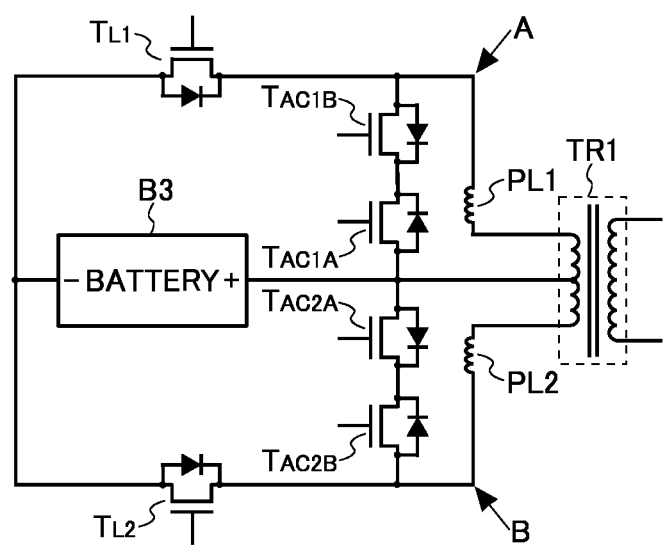
FIG. 27 illustrates a configuration of a push-pull circuit as in a second preferred example.

The description shall now relate to the push-pull circuit as in the second preferred example. FIG. 27 illustrates a configuration of a push-pull circuit as in a second preferred example. Portions in FIG. 27 identical to those in FIG. 21 have been assigned an identical reference numeral, and a detailed description thereof has been omitted, with the exception of the transistors $T_{AC1}$ and $T_{AC2}$ in FIG. 11A, which in FIG. 27 have been changed to being transistors $T_{AC1A}$ and $T_{AC2A}$.

The push-pull circuit as in the second preferred example in FIG. 27 is a configuration in which the diodes $D_{AC1}$ and $D_{AC2}$ from the push-pull circuit as in the first preferred example illustrated in FIG. 21 have been taken away and, instead, transistors $T_{AC1B}$ and $T_{AC2B}$ for synchronous rectification are provided. It is possible to ensure an even greater increase in efficiency because loss commensurate with a diode can be reduced by performing synchronous rectification.

Figure 28:
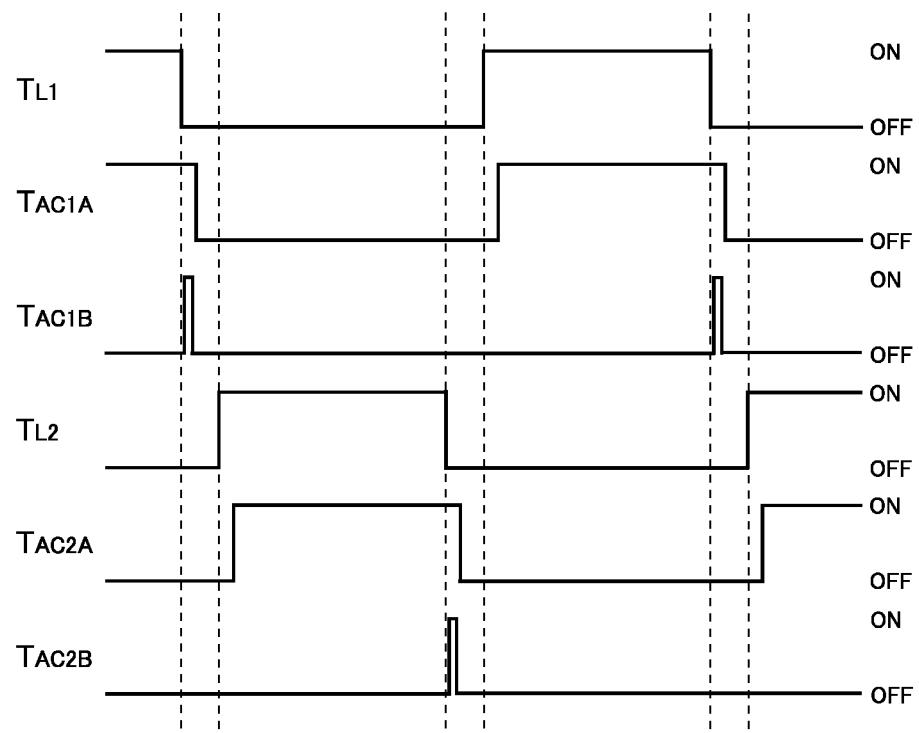
FIG. 28 is a timing chart illustrating the timing for switching between ON and OFF in respective transistors of the push-pull circuit as in the second preferred example.
Figure 29:
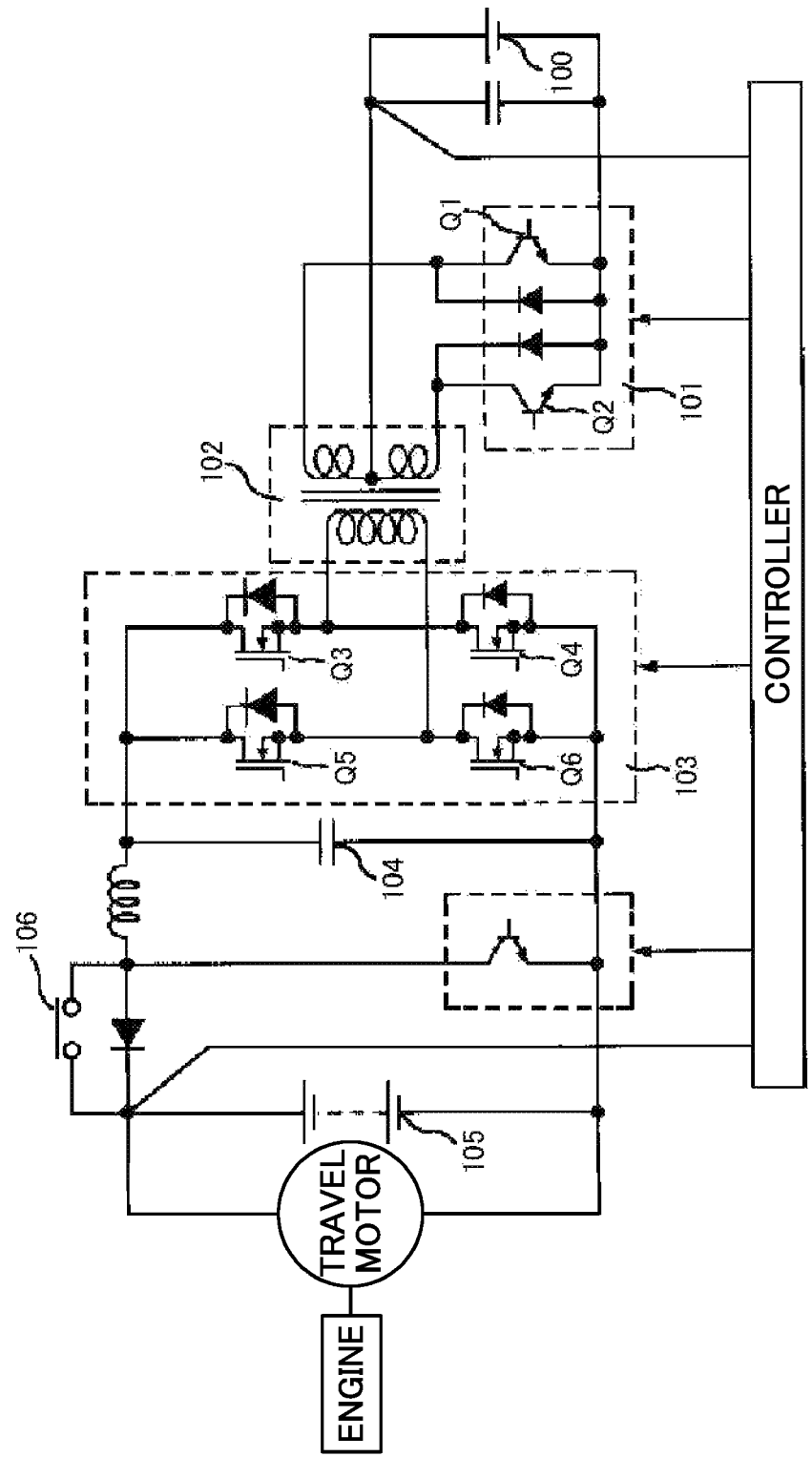
FIG. 29 illustrates the configuration of the power source device disclosed in Japanese Laid-open Patent Publication 2000-50402.

In the push-pull circuit as in the second preferred example illustrated in FIG. 27, it is necessary for the transistor $T_{AC1B}$ to be switched from "off" to "on" after the transistor $T_{L1}$ has been switched from "on" to "off," necessary for the transistor $T_{AC1B}$ to be switched from "on" to "off" before the transistor $T_{AC1A}$ is switched from "on" to "off," necessary for the transistor $T_{AC2B}$ to be switched from "off" to "on" after the transistor $T_{L2}$ has been switched from "on" to "off," and necessary for the transistor $T_{AC2B}$ to be switched from "on" to "off" before the transistor $T_{AC2A}$ is switched from "on" to "off." For this reason, the switching between "on" and "off" for the transistors $T_{L1}$, $T_{L2}$, $T_{AC1A}$, $T_{AC2A}$, $T_{AC1B}$, and $T_{AC2B}$ may be carried out with, e.g., the timing illustrated in FIG. 28.

The example of the power source configuration for drivers for driving the transistors $T_{AC1}$ and $T_{AC2}$ in the push-pull circuit as in the second preferred example illustrated in FIG. 27 is similar with respect to the case of the push-pull circuit as in the first preferred example illustrated in FIG. 21, and thus a description thereof has been omitted.

Were the fixed-factor bidirectional DC/DC converters illustrated in FIGS. 11A, 12, and 14 not to have a voltage-varying function, there is a possibility that the circuitry would be broken by the fixed factor DC/DC conversion in a case where a battery is connected to an output unit as is depicted. For this reason, there is adopted a configuration in which the inductors PL1, PL2, and SL1 are added to the fixed factor bidirectional DC/DC converters illustrated in FIGS. 11A, 12, and 14, and in which the fixed factor bidirectional DC/DC converters illustrated in FIGS. 11A, 12, and 14 have a voltage-varying function.

Similarly, were the fixed-factor bidirectional DC/DC converter illustrated in FIG. 11B not to have a voltage-varying function, then there is a possibility that the circuitry would be broken by the fixed factor DC/DC conversion in a case where a battery is connected to an output unit as is depicted. For this reason, there is adopted a configuration in which the inductors PL1, PL2, and SL2 are added to the fixed factor bidirectional DC/DC converter illustrated in FIG. 11B, and in which the fixed factor bidirectional DC/DC converter illustrated in FIG. 11B has a voltage-varying function.

However, in a case where any of the fixed factor bidirectional DC/DC converters illustrated in FIG. 11A, 11B, 12, or 14 is used instead of the circuit constituted of the first switching circuit 11, the transformer TR1, and the second switching circuit 12 of the DC/DC converter illustrated in FIG. 8, then there is no need to provide these inductors to the fixed-factor bidirectional DC/DC converter, because the step-up/down chopper circuit 13, which is a variable-factor bidirectional DC/DC converter, is provided to the DC/DC converter illustrated in FIG. 8.

The content of the embodiments described above and the modification examples described above can be implemented in any combination, as long as there is no incompatibility.

What is claimed is:

1. A DC/DC converter, comprising:
   a first DC/DC converter, and
   a second DC/DC converter for carrying out a DC/DC conversion of voltage supplied from the first DC/DC converter;
   wherein one of the first DC/DC converter and the second DC/DC converter is a fixed-factor DC/DC converter, and
   the other one of the first DC/DC converter and the second DC/DC converter is a variable-factor DC/DC converter.

2. The DC/DC converter of claim 1,
   the fixed-factor DC/DC converter being an insulation-type DC/DC converter having a transformer, and
   the variable-factor DC/DC converter being a non-insulation-type DC/DC converter.

3. The DC/DC converter of claim 1,
   the first DC/DC converter being the variable-factor DC/DC converter, the second DC/DC converter being the fixed-factor DC/DC converter, the DC/DC converter comprising a load circuit connected to a connection point between the first DC/DC converter and the second DC/DC converter, the load circuit being a load circuit capable of switching between an operating state and a non-operating state, and the first DC/DC converter and the second DC/DC converter being DC/DC converters for carrying out a step-down operation.

4. The DC/DC converter of claim 1,
the first DC/DC converter and the second DC/DC converter being bidirectional DC/DC converters.

5. The DC/DC converter of claim 4,
the variable-factor DC/DC converter carrying out a DC/DC conversion in a direction from the variable-factor DC/DC converter toward the fixed-factor DC/DC converter and gradually stepping up the voltage of the connection point between the fixed-factor DC/DC converter and the variable-factor DC/DC converter,
before the DC/DC converter starts a power transmission operation from the fixed-factor DC/DC converter to the variable-factor DC/DC converter.

6. The DC/DC converter of claim 1,
an operating frequency of the first DC/DC converter and an operating frequency of the second DC/DC converter being mutually different.

7. A solar charging system, comprising:
a solar cell;
a first power storage device for storing power outputted from the solar cell;
a second power storage device having a greater voltage than the first power storage device; and
a DC/DC converter for transmitting power between the first power storage device and the second power storage device;
wherein the DC/DC converter comprises:
a first DC/DC converter, and a second DC/DC converter for carrying out a DC/DC conversion of voltage supplied from the first DC/DC converter; and
wherein one of the first DC/DC converter and the second DC/DC converter is a fixed-factor DC/DC converter, and
the other one of the first DC/DC converter and the second DC/DC converter is a variable-factor DC/DC converter.

8. The solar charging system of claim 7,
the fixed-factor DC/DC converter being an insulation-type DC/DC converter having a transformer, and
the variable-factor DC/DC converter being a non-insulation-type DC/DC converter.

9. The solar charging system of claim 7,
the first DC/DC converter being the variable-factor DC/DC converter,
the second DC/DC converter being the fixed-factor DC/DC converter,
the DC/DC converter comprising a load circuit connected to a connection point between the first DC/DC converter and the second DC/DC converter,
the load circuit being a load circuit capable of switching between an operating state and a non-operating state, and
the first DC/DC converter and the second DC/DC converter being DC/DC converters for carrying out a step-down operation.

10. The solar charging system of claim 7,
the first DC/DC converter and the second DC/DC converter being bidirectional DC/DC converters.

11. The solar charging system of claim 10,
the variable-factor DC/DC converter carrying out a DC/DC conversion in a direction from the variable-factor DC/DC converter toward the fixed-factor DC/DC converter and gradually stepping up the voltage of the connection point between the fixed-factor DC/DC converter and the variable-factor DC/DC converter,
before the DC/DC converter starts a power transmission operation from the fixed-factor DC/DC converter to the variable-factor DC/DC converter.

12. The solar charging system of claim 7,
an operating frequency of the first DC/DC converter and an operating frequency of the second DC/DC converter being mutually different.

13. A movable body, comprising:
a solar charging system;
wherein the solar charging system comprises:
a solar cell;
a first power storage device for storing power outputted from the solar cell;
a second power storage device having a greater voltage than the first power storage device; and
a DC/DC converter for transmitting power between the first power storage device and the second power storage device;
wherein the DC/DC converter comprises:
a first DC/DC converter, and a second DC/DC converter for carrying out a DC/DC conversion of voltage supplied from the first DC/DC converter; and
wherein one of the first DC/DC converter and the second DC/DC converter is a fixed-factor DC/DC converter, and
the other one of the first DC/DC converter and the second DC/DC converter is a variable-factor DC/DC converter.

14. The movable body of claim 13,
the fixed-factor DC/DC converter being an insulation-type DC/DC converter having a transformer, and
the variable-factor DC/DC converter being a non-insulation-type DC/DC converter.

15. The movable body of claim 13,
the first DC/DC converter being the variable-factor DC/DC converter,
the second DC/DC converter being the fixed-factor DC/DC converter,
the DC/DC converter comprising a load circuit connected to a connection point between the first DC/DC converter and the second DC/DC converter,
the load circuit being a load circuit capable of switching between an operating state and a non-operating state, and
the first DC/DC converter and the second DC/DC converter being DC/DC converters for carrying out a step-down operation.

16. The movable body of claim 13,
the first DC/DC converter and the second DC/DC converter being bidirectional DC/DC converters.

17. The movable body of claim 16,
the variable-factor DC/DC converter carrying out a DC/DC conversion in a direction from the variable-factor DC/DC converter toward the fixed-factor DC/DC converter and gradually stepping up the voltage of the connection point between the fixed-factor DC/DC converter and the variable-factor DC/DC converter, before the DC/DC converter starts a power transmission operation from the fixed-factor DC/DC converter to the variable-factor DC/DC converter.

18. The movable body of claim 13,
an operating frequency of the first DC/DC converter and an operating frequency of the second DC/DC converter being mutually different.

19. The movable body of claim 13,
power outputted from the second power storage device being used as power for driving the movable body.

* * * * *